(12) United States Patent
Mendell

(10) Patent No.: US 11,765,434 B2
(45) Date of Patent: Sep. 19, 2023

(54) SYSTEMS AND METHODS FOR CONTROLLING COMPUTER RECORDED DATA BASED ON CLIENT MESSAGES

(71) Applicant: DraftKings, Inc., Boston, MA (US)

(72) Inventor: Jordan Mendell, Boca Raton, FL (US)

(73) Assignee: DRAFTKINGS, INC., Boston, MA (US)

( * ) Notice: Subject to any disclaimer, the term of this patent is extended or adjusted under 35 U.S.C. 154(b) by 0 days.

(21) Appl. No.: 17/976,120

(22) Filed: Oct. 28, 2022

(65) Prior Publication Data

US 2023/0137828 A1 May 4, 2023

Related U.S. Application Data

(60) Provisional application No. 63/273,580, filed on Oct. 29, 2021.

(51) Int. Cl.
| | | |
|---|---|---|
| *H04N 21/458* | (2011.01) | |
| *H04N 21/475* | (2011.01) | |
| *H04N 21/488* | (2011.01) | |
| *H04N 21/2187* | (2011.01) | |

(52) U.S. Cl.
CPC ....... *H04N 21/458* (2013.01); *H04N 21/2187* (2013.01); *H04N 21/4753* (2013.01); *H04N 21/4882* (2013.01)

(58) Field of Classification Search
CPC ............. H04N 21/458; H04N 21/2187; H04N 21/4753; H04N 21/4882
See application file for complete search history.

(56) References Cited

U.S. PATENT DOCUMENTS

| | | |
|---|---|---|
| 5,830,068 A | 11/1998 | Brenner et al. |
| 6,735,487 B1 | 5/2004 | Marshall et al. |
| 8,538,563 B1 * | 9/2013 | Barber ................ G07F 17/3276 463/28 |
| 10,664,138 B2 | 5/2020 | Carney et al. |
| 2005/0005291 A1 * | 1/2005 | McGinley .......... H04N 21/4334 725/39 |

(Continued)

FOREIGN PATENT DOCUMENTS

EP    1 484 723 A2    12/2004

OTHER PUBLICATIONS

Final Office Action on U.S. Appl. No. 17/516,150 dated May 27, 2022.

(Continued)

*Primary Examiner* — Robert J Hance
(74) *Attorney, Agent, or Firm* — Foley & Lardner LLP

(57) ABSTRACT

The present disclosure provides event capture systems having one or more processors coupled to memory. The event capture system can identify a wager corresponding to a live event associated with a client device. The event capture system can identify a broadcast receiver device corresponding to the client device. The event capture system can generate recording instructions for the broadcast receiver device that cause the broadcast receiver device to initiate a recording of a broadcast of the live event. The event capture system can transmit the recording instructions to the broadcast receiver device to cause the broadcast receiver device to schedule a recording for the broadcast of the live event.

16 Claims, 8 Drawing Sheets

(56) References Cited

U.S. PATENT DOCUMENTS

| | | | |
|---|---|---|---|
| 2008/0066111 A1* | 3/2008 | Ellis | H04N 21/458 |
| | | | 725/57 |
| 2008/0112690 A1 | 5/2008 | Shahraray et al. | |
| 2008/0148317 A1 | 6/2008 | Opaluch | |
| 2009/0082095 A1 | 3/2009 | Walker et al. | |
| 2009/0183178 A1 | 7/2009 | Imai et al. | |
| 2009/0288118 A1 | 11/2009 | Chang | |
| 2010/0262986 A1 | 10/2010 | Adimatyam et al. | |
| 2013/0002716 A1 | 1/2013 | Walker et al. | |
| 2013/0282421 A1 | 10/2013 | Graff et al. | |
| 2014/0062696 A1* | 3/2014 | Packard | H04N 21/23418 |
| | | | 340/540 |
| 2014/0129570 A1 | 5/2014 | Johnson | |
| 2014/0130079 A1 | 5/2014 | Arora et al. | |
| 2014/0201769 A1 | 7/2014 | Neumeier et al. | |
| 2014/0282721 A1 | 9/2014 | Kuncl et al. | |
| 2015/0163547 A1 | 6/2015 | Whitten | |
| 2017/0034594 A1 | 2/2017 | Francis et al. | |
| 2017/0070769 A1 | 3/2017 | Bostick et al. | |
| 2018/0048936 A1 | 2/2018 | Gupta et al. | |
| 2018/0060439 A1 | 3/2018 | Kula et al. | |
| 2018/0108380 A1* | 4/2018 | Packard | H04N 21/2668 |
| 2019/0205839 A1 | 7/2019 | Dotan-Cohen et al. | |
| 2019/0268663 A1 | 8/2019 | Fischer | |
| 2019/0349638 A1 | 11/2019 | Baek et al. | |
| 2019/0362601 A1 | 11/2019 | Kline et al. | |
| 2019/0384469 A1 | 12/2019 | Lo et al. | |
| 2020/0213678 A1 | 7/2020 | Pleiman | |
| 2020/0245017 A1 | 7/2020 | Ganschow et al. | |
| 2020/0252664 A1 | 8/2020 | Weinraub | |
| 2020/0357246 A1 | 11/2020 | Nelson et al. | |
| 2021/0076099 A1 | 3/2021 | Ganschow et al. | |
| 2021/0217269 A1 | 7/2021 | Huke et al. | |
| 2022/0103905 A1* | 3/2022 | Montgomery | H04N 21/858 |
| 2022/0157127 A1* | 5/2022 | Tadepalli | H04N 21/6408 |

OTHER PUBLICATIONS

Non-Final Office Action on U.S. Appl. No. 17/516,150 dated Jan. 28, 2022.
Non-Final Office Action on U.S. Appl. No. 17/516,134 dated Feb. 1, 2022.
Non-Final Office Action on U.S. Appl. No. 17/516,197 dated Jan. 13, 2022.
Non-Final Office Action on U.S. Appl. No. 17/516,200 dated Dec. 21, 2021.
Notice of Allowance on U.S. Appl. No. 17/516,134 dated Jun. 6, 2022.
Notice of Allowance on U.S. Appl. No. 17/516,197 dated May 6, 2022.
Notice of Allowance on U.S. Appl. No. 17/516,200 dated Apr. 27, 2022.
Final Office Action on U.S. Appl. No. 17/516,150 dated Mar. 10, 2023.
Non-Final Office Action on U.S. Appl. No. 17/516,150 dated Nov. 18, 2022.
Non-Final Office Action on U.S. Appl. No. 17/976,097 dated Mar. 2, 2023.
Non-Final Office Action on U.S. Appl. No. 17/976,107 dated Mar. 28, 2023.
Non-Final Office Action on U.S. Appl. No. 17/976,130 dated Feb. 2, 2023.
Non-Final Office Action on U.S. Appl. No. 17/976,141 dated Mar. 16, 2023.
Final Office Action on U.S. Appl. No. 17/976,130 dated Jun. 1, 2023.
Final Office Action on U.S. Appl. No. 17/976,097 dated Jul. 10, 2023.
Final Office Action on U.S. Appl. No. 17/976,141 dated Jul. 13, 2023.

* cited by examiner

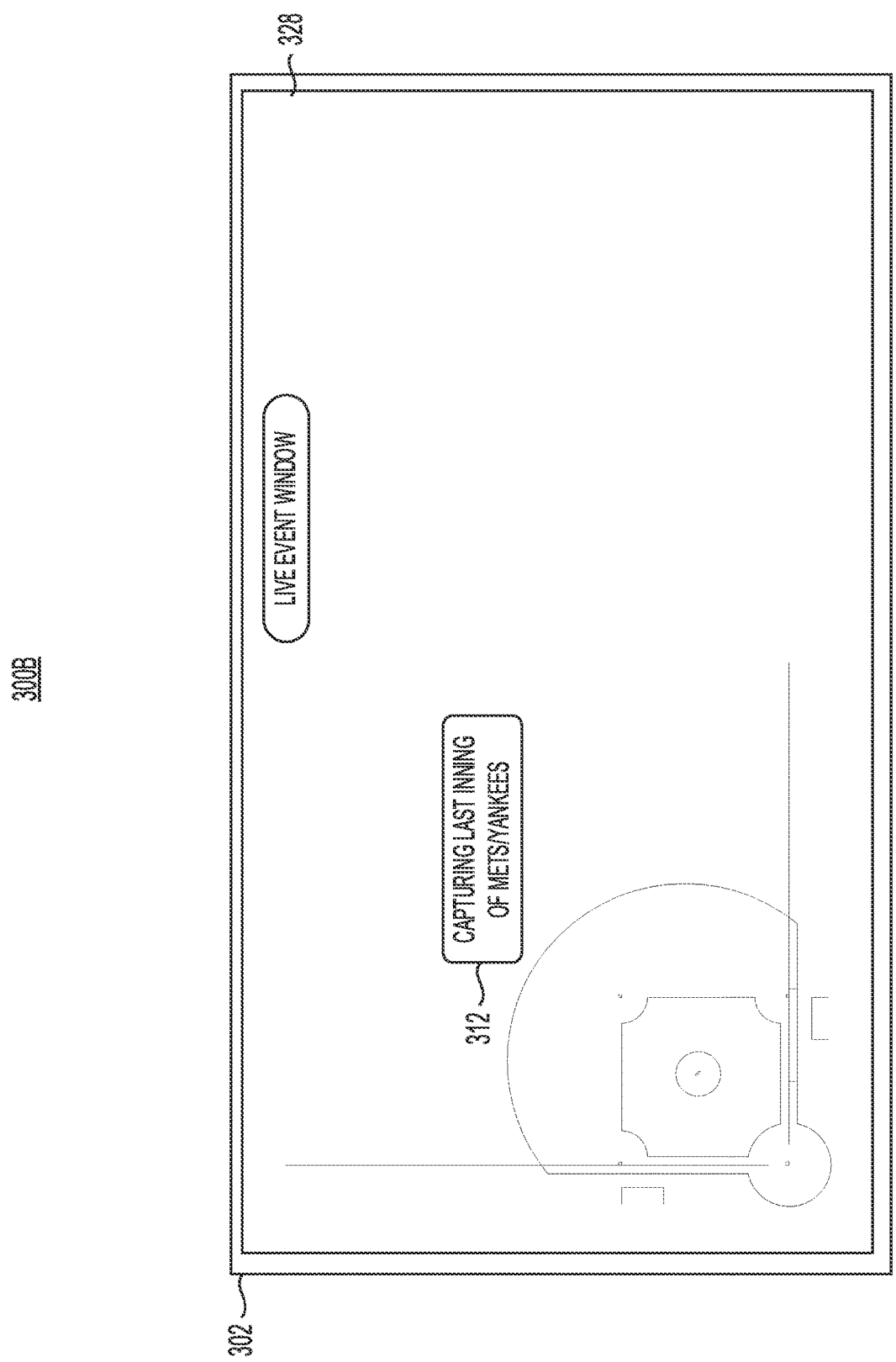

SYSTEMS AND METHODS FOR CONTROLLING COMPUTER RECORDED DATA BASED ON CLIENT MESSAGES

CROSS-REFERENCE TO RELATED APPLICATIONS

The present application claims the benefit of and priority to U.S. Provisional Patent Application No. 63/273,580, filed Oct. 29, 2021, and titled "SYSTEMS AND METHODS FOR IMPROVED MANAGEMENT OF PROCESSING BROADCAST DATA," the contents of which is incorporated herein by reference in its entirety for all purposes.

BACKGROUND

Broadcast devices, such as cable boxes or set-top boxes, are used to display broadcast content received from a broadcast source. Due to the one-to-many nature of broadcast content, it is challenging to monitor and display information relating to a specific broadcast device with broadcast content.

SUMMARY

In addition, broadcast receiver devices, such as cable boxes or set top boxes, often include additional functionality that enables recording of content broadcasts. However, conventional systems require manual input at the broadcast receiver device to schedule a recording of broadcast content. This significantly limits the flexibility of broadcast recording systems. It is therefore advantageous for a system to automatically record or store records of broadcasts, such as live events, based on input from other computing devices. Conventional broadcast systems do not communicate with other computing systems that capture user input, and thus, cannot record or store broadcasts automatically that relate to user interests, actions, or online activities. The event capture system described herein can automatically generate recording instructions for broadcast receiver devices to record broadcast content based on one or more online activities of a player. Thus, the systems and methods of this technical solution provide a technical improvement to broadcast capture systems by extending the functionality of broadcast receiver devices, namely by, generating and providing recording instructions based on user input at other computing devices or systems.

At least one aspect of the present disclosure is directed to an event capture system. The event capture system can include one or more processors coupled to memory. The event capture system can identify a wager corresponding to a live event associated with a client device. The event capture system can identify a broadcast receiver device corresponding to the client device. The event capture system can generate recording instructions for the broadcast receiver device that cause the broadcast receiver device to initiate a recording of a broadcast of the live event. The event capture system can transmit the recording instructions to the broadcast receiver device to cause the broadcast receiver device to schedule a recording for the broadcast of the live event.

In some implementations, the event capture system can determine a broadcast schedule of the live event based on information received from the broadcast receiver device and generate the recording instructions for the broadcast receiver device further based on the broadcast schedule of the live event. In some implementations, the event capture system can determine a broadcast schedule of the live event based on information received from a third-party data source and generate the recording instructions for the broadcast receiver device further based on the broadcast schedule of the live event. In some implementations, the event capture system can be further configured to maintain a data structure storing an association between an identifier of the wager, an identifier of the client device, and an identifier of the broadcast receiver device corresponding to the client device. In some implementations, the event capture system can receive, from the client device, a request to record live events corresponding to wagers associated with the client device and generate the recording instructions responsive to the request to record live events corresponding to wagers associated with the client device.

In some implementations, the request to record live events corresponding to wagers is included in the wager corresponding to the live event associated with the client device. In some implementations, the event capture system can determine that the wager corresponds to a portion of the live event and generate the recording instructions to initiate a recording of only the portion of the live event corresponding to the wager. In some implementations, to identify the broadcast receiver device corresponding to the client device, the event capture system are further configured to identify, from a user profile used by the client device to communicate with the one or more processors, an identifier of the broadcast receiver device corresponding to the client device.

In some implementations, to generate the recording instructions for the broadcast receiver device, the event capture system can be further configured to generate a notification for display by the broadcast receiver device that indicates the recording of the broadcast of the live event has been scheduled. In some implementations, the event capture system can determine that the broadcast receiver device is authorized to record the broadcast of the live event and generate the recording instructions responsive to determining that the broadcast receiver device is authorized to record the broadcast of the live event.

Various implementations relate to a method, the method implemented by one or more processors coupled to memory. The method includes identifying a wager corresponding to a live event associated with a client device. The method further includes identifying a broadcast receiver device corresponding to the client device. The method further includes generating recording instructions for the broadcast receiver device that cause the broadcast receiver device to initiate a recording of a broadcast of the live event. The method further includes transmitting the recording instructions to the broadcast receiver device to cause the broadcast receiver device to schedule a recording for the broadcast of the live event.

In some implementations, the further includes determining, by the one or more processors, a broadcast schedule of the live event based on information received from the broadcast receiver device and wherein generating the recording instructions for the broadcast receiver device is further based on the broadcast schedule of the live event. In some implementations, the further includes determining a broadcast schedule of the live event based on information received from a third-party data source and wherein generating the recording instructions for the broadcast receiver device is further based on the broadcast schedule of the live event. In some implementations, the further includes maintaining, by the one or more processors, a data structure storing an association between an identifier of the wager, an identifier of the client device, and an identifier of the broadcast receiver device corresponding to the client device. In some implementations, the further includes receiving, by the one or more processors, from the client device, a request to record live events corresponding to wagers associated with the client device and wherein generating the recording instructions is responsive to the request to record live events corresponding to wagers associated with the client device.

In some implementations, the request to record live events corresponding to wagers is included in the wager corresponding to the live event associated with the client device. In some implementations, the further includes determining, by the one or more processors, that the wager corresponds to a portion of the live event and generating, by the one or more processors, the recording instructions to initiate a recording of only the portion of the live event corresponding to the wager. In some implementations, identifying the broadcast receiver device corresponding to the client device further includes identifying from a user profile used by the client device to communicate with the one or more processors, an identifier of the broadcast receiver device corresponding to the client device.

In some implementations, generating the recording instructions for the broadcast receiver device further includes generating a notification for display by the broadcast receiver device that indicates the recording of the broadcast of the live event has been scheduled. In some implementations, the further includes determining, by the one or more processors, that the broadcast receiver device is authorized to record the broadcast of the live event and generating, by the one or more processors, the recording instructions responsive to determining that the broadcast receiver device is authorized to record the broadcast of the live event.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A and 3B illustrate example live event broadcasts displayed on a broadcast receiver device depicted in FIG. 2, in accordance with one or more implementations.

DETAILED DESCRIPTION

Below are detailed descriptions of various concepts related to, and implementations of, techniques, approaches, methods, apparatuses, and systems for extracting parameters from invoices using a cloud computing system. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for event capture systems.

A. Computing and Network Environment

Figure 1A:
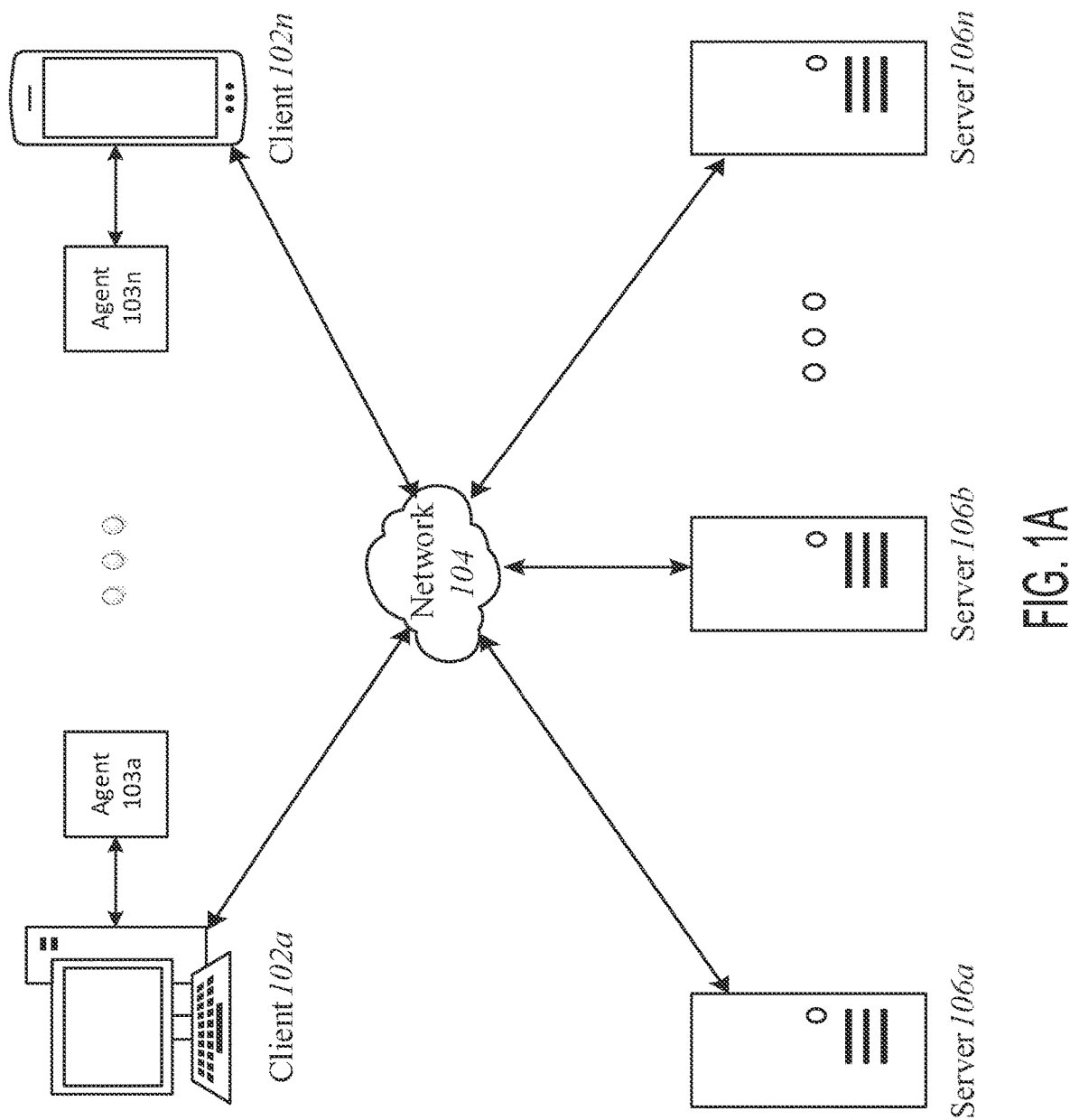
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes one or more machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, one or more nodes 290 may be in the path between any two communicating servers.

Figure 1B:
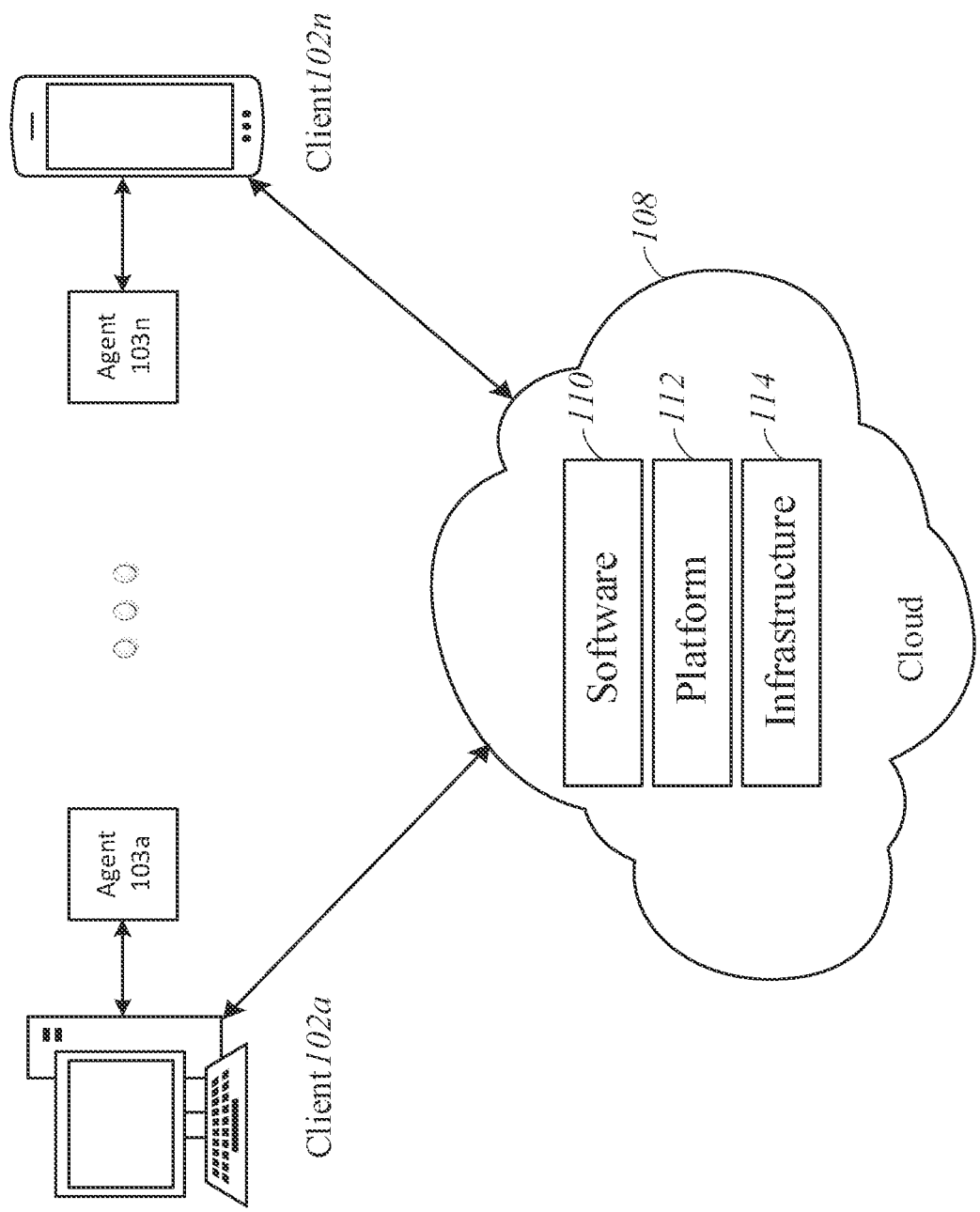
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
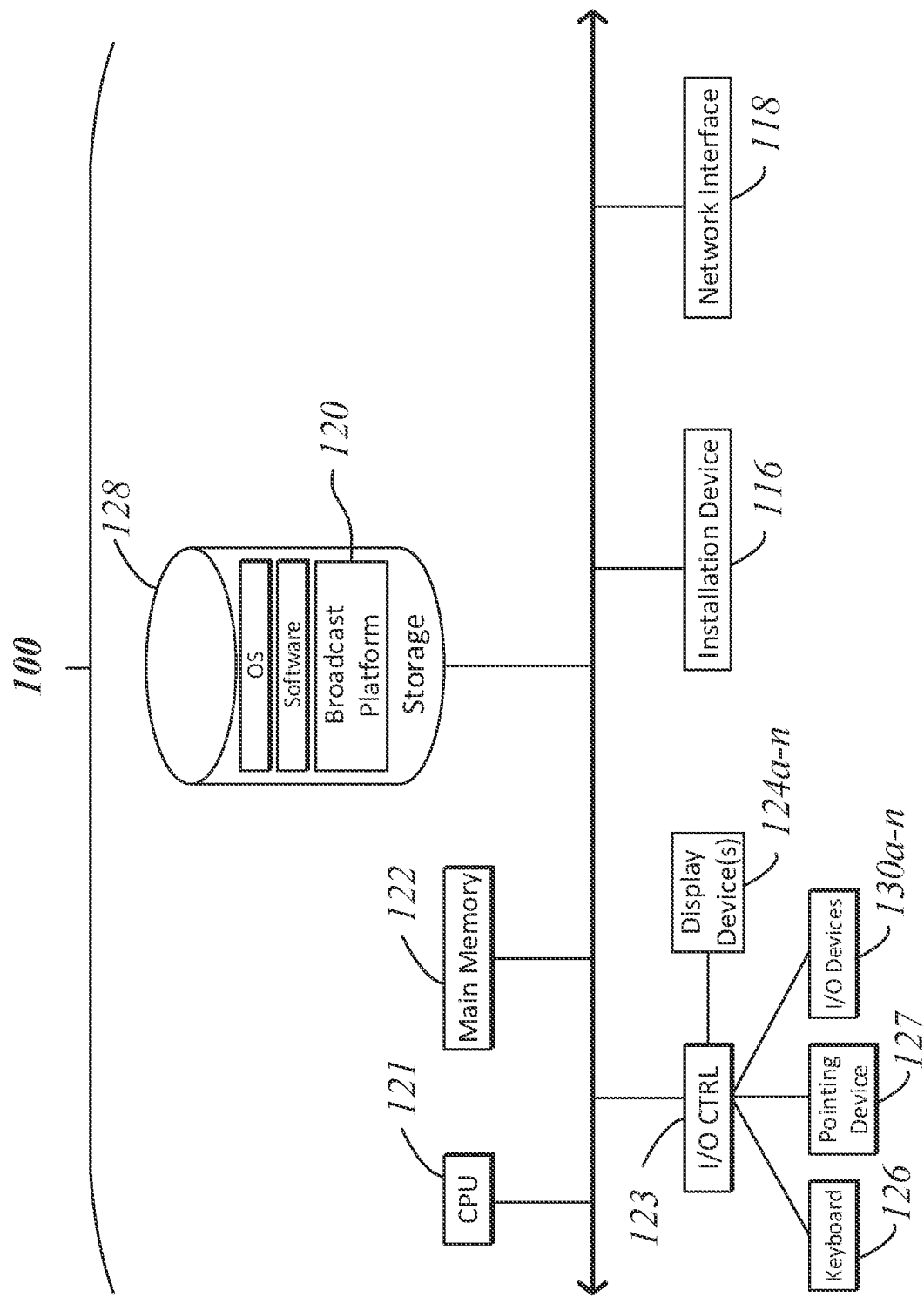
FIGS. 1C and 1D are block diagrams depicting embodiments of computing devices useful in connection with the methods and systems described herein.
Figure 1D:
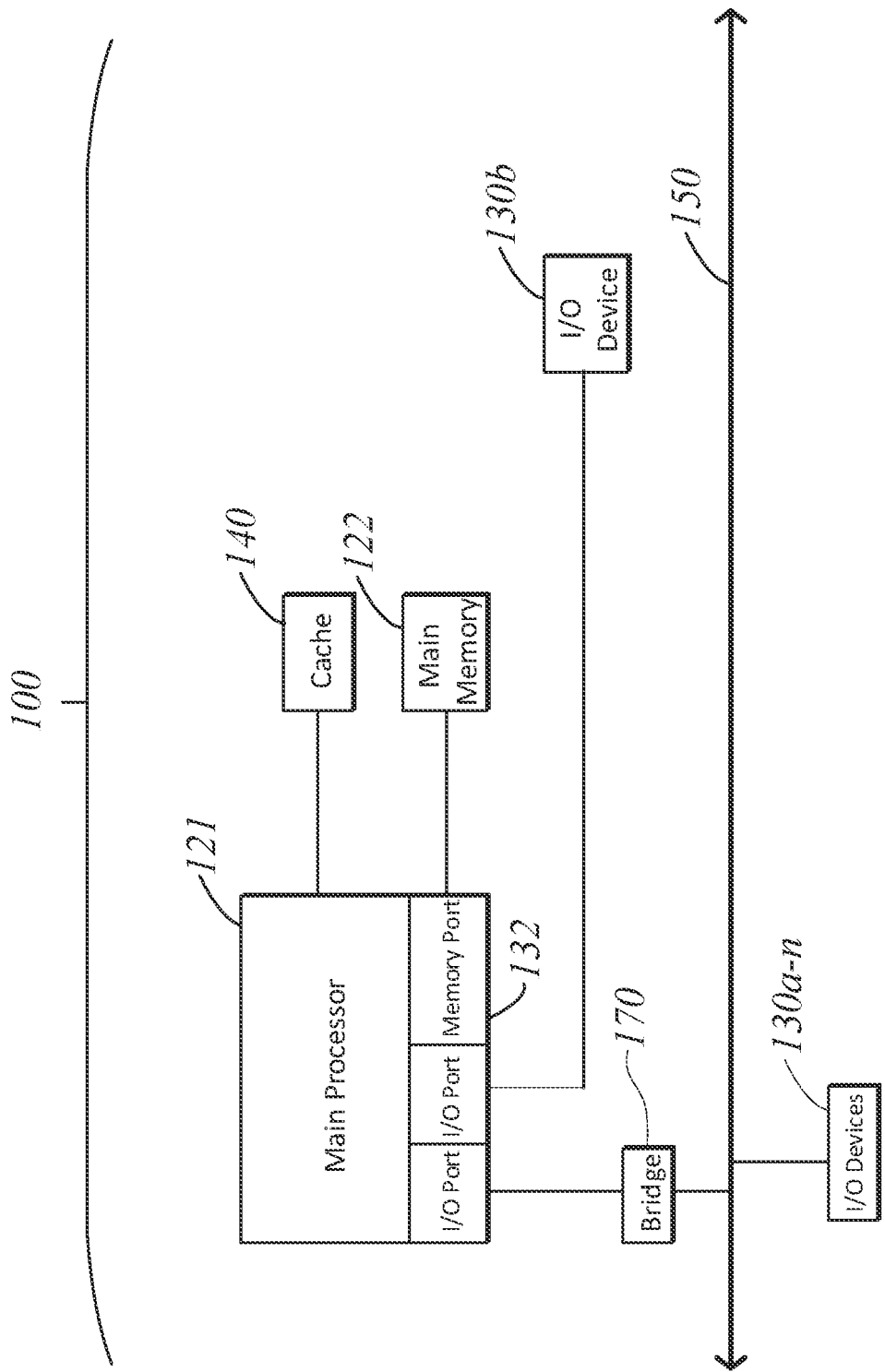

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and broadcast platform 120, which can implement any of the features of the event capture system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (B SRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the broadcast platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, an event capture system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is an event capture system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., an event capture system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by one or more metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Event Capture Systems with Recording Instruction Generation

Conventionally, broadcast receiver systems or devices, such as cable boxes, set top boxes, and satellite receiver boxes, operate using fixed hardware and software that does not enable third-party communications with external sources. For example, although cable boxes may communicate with broadcast provider systems, such as cable providers or other broadcast providers, such receiver boxes are generally unable to display additional content or monitor the broadcast content displayed by broadcast provider systems. Further, even if such broadcast receiver devices include applications that can communicate with third-party servers, these devices do not include the capabilities to display content or application information at the same time (e.g., in a seamless manner) as broadcast content provided by broadcast systems. The systems and methods of this technical solution these and other issues by extending the functionality of applications and environments on broadcast receiver devices, to provide applications that display additional content, which may include notifications, alerts, or other interactive interfaces, with broadcast content. To do so, a server or other external computing device can generate display instructions for applications executing on such broadcast receiver devices to display additional user interfaces with broadcast content, and transmit those instructions via a computer network or via a proprietary broadcast network maintained by a broadcast provider. In doing so, the additional content, which may include interactive user interfaces, can be displayed such that it that seamlessly integrates the application interfaces with broadcast content provided by a broadcast provider system.

The systems and methods of this technical solution provide techniques for improved event capture systems that generate and provide instructions to record content broadcasts in response to identifying certain online activities. The event capture system described herein can be implemented, for example, in a cloud computing environment, such as the cloud computing environment 108 described herein above in conjunction with FIGS. 1A and 1B. In general, event capture systems can provide recording instructions to broadcast receiver devices that cause the broadcast receiver devices to schedule a recording for broadcasts of a live events related to online actions performed by a user (e.g., a wager, a request to record the live event, etc.). One example of a wager is a straight bet in which a player wagers on a single game or event that carries a point-spread or total, and where a player receives a payout if they correctly wager on the team or event that covers the spread. Another example of a wager is a parlay bet in which a player wagers on two or more games or events (e.g., using money line bets, straight bets, proposition (or prop) bets, teaser bets) together, and where a player receives a payout if they correctly wagered on each game or event. However, it should be understood that other payout schemes are possible.

The systems and methods described herein improve upon the limitations of conventional broadcast systems by automatically generating and communicating recording instructions to a broadcast receiver device based on online actions of a player, such as a wager. In some implementations, a wager may be placed by a player before the live event. In various implementations, a wager may be placed in real-time during the live event. Accordingly, upon identifying wagers of players the event capture system can generate and provide recording instructions to broadcast receiver devices associated with the player. It should be understood that in some implementations, recording instructions may be provided without a player interaction or online activity (e.g., wager).

The systems and methods described herein leverage cloud computing and live event technology to provide recording instructions for live events to player devices, such as broadcast receivers, laptops, smart phones, personal computers, smart televisions, or other such computing devices. Although certain aspects of the computing systems described herein are represented as taking place over a network, it should be understood that similar operations can take place on an event capture system, such as a sportsbook machine, or another type of independent event capture systems that may not require communications between an event capture system and a separate live event client and/or broadcast receiver to effectuate the operations described herein. These and other features of event capture system are described in greater detail herein below.

In addition, the term "broadcast" need not necessarily be limited to content provided via proprietary television networks (e.g., cable, fiber-optic, satellite, etc.). Indeed, the term "broadcast," as used herein, may be used to describe both television content and live-streaming content provided via computer networks from one or more servers. Such live streams may be provided to various client devices or broadcast receiver devices via one or more computer networks. The live streams may depict live events such as sport games, poker matches, Olympic Games, live reality shows, and live game shows, among others.

Figure 2:
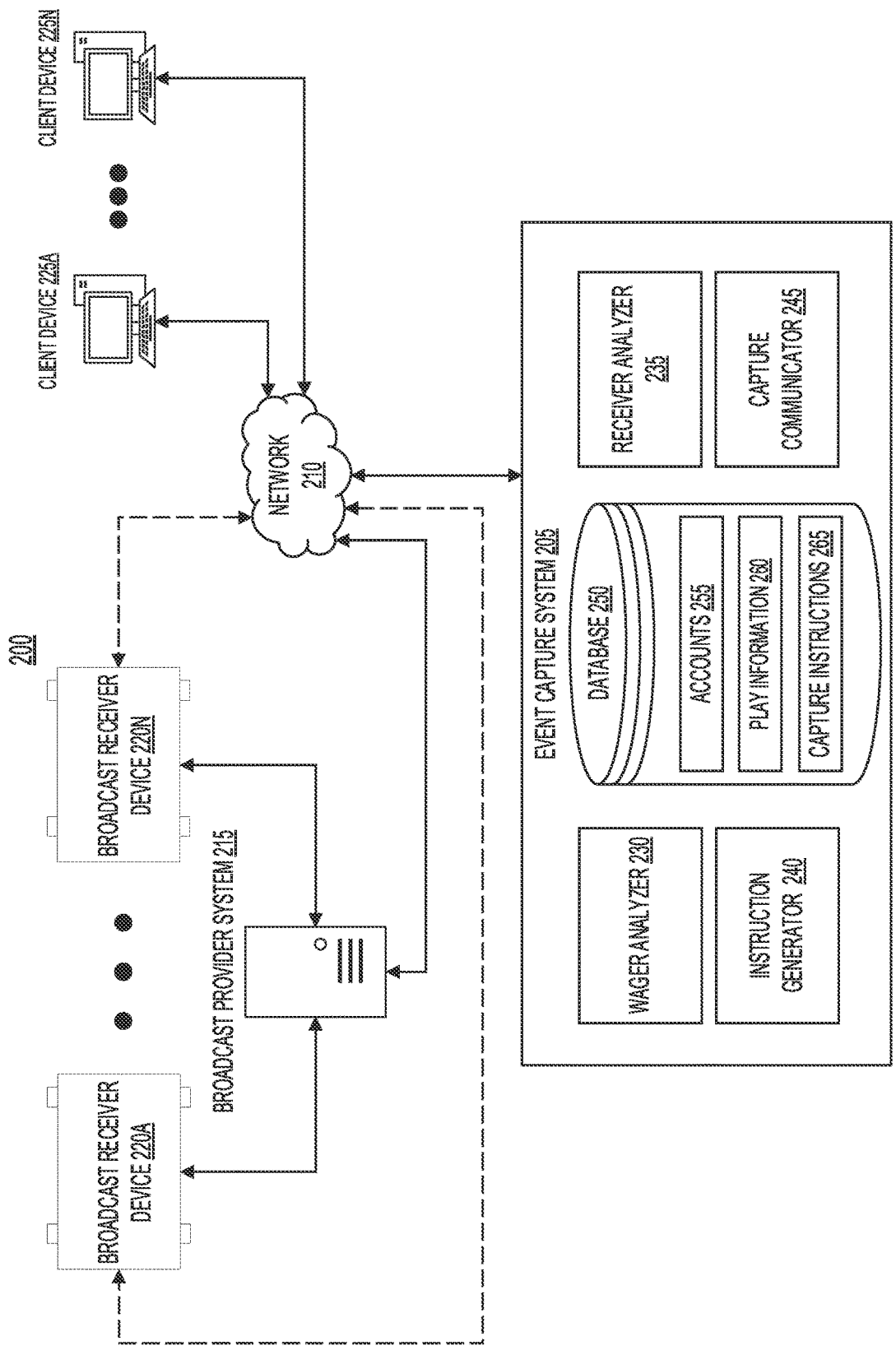
FIG. 2 is a block diagram of an example event capture system, in accordance with one or more implementations.

Referring now to FIG. 2, illustrated is a block diagram of an example system 200, in accordance with one or more implementations. The system 200 can include at least one event capture system 205, at least one network 210, a broadcast provider system 215, and one or more broadcast receiver devices 220A-220 (sometimes generally referred to as broadcast receiver device(s) 220), one or more client devices 225A-225N (sometimes generally referred to as client device(s) 225). The event capture system 205 can include at least one wager analyzer 230, at least one receiver analyzer 235, at least one instruction generator 240, at least one capture communicator 245, and at least one database 250. The database 250 can include one or more accounts 255, one or more play information 260 data structures (sometimes generally referred to as the play information 260), and one or more capture instructions 265 data structures (sometimes generally referred to as the capture instructions 265). In some implementations, the database 250 can be external to the event capture system 205, for example, as a part of a cloud computing system or an external computing device in communication with the devices (e.g., the event capture system 205, the broadcast provider system 215, the broadcaster receiver devices 220, and/or the client devices 225, etc.) of the system 200 via the network 210.

Each of the components (e.g., the event capture system 205, the network 210, the broadcast provider system 215, the broadcast receiver device 220, the client devices 225, the live event communicator 230, the live event monitor 235, the live event analyzer 240, the device determiner 245, etc.) of the system 200 can be implemented using the hardware components or a combination of software with the hardware components of a computing system, such as the computing system 100 detailed herein in conjunction with FIGS. 1A-1D, or any other computing system described herein. Each of the components of the event capture system 205 can perform the functionalities detailed herein.

The event capture system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The event capture system 205 can include one or more computing devices or servers that can perform various functions as described herein. The event capture system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The event capture system 205 of the system 200 can communicate via the network 210, for instance with one or more client devices 225. The network 210 may be any form of computer network that can relay information between the event capture system 205, the broadcast provider system 215, the broadcast receiver devices 220, the one or more client devices 225, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210.

The network 210 may further include any number of hardwired and/or wireless connections. Any or all of the computing devices described herein (e.g., the event capture system 205, the broadcast provider system 215, the broadcast receiver devices 220, the one or more client devices 225, the computer system 100, etc.) may communicate wirelessly (e.g., via WiFi, cellular, radio, etc.) with a transceiver that is hardwired (e.g., via a fiber optic cable, a CAT6 cable, etc.) to other computing devices in the network 210. Any or all of the computing devices described herein (e.g., the event capture system 205, the broadcast provider system 215, the broadcast receiver devices 220, the one or more client devices 225, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

The broadcast provider system 215 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast provider system 215 can include one or more computing devices or servers that can perform various functions as described herein. The broadcast provider system 215 can include any or all of the components and perform any or all of the functions of the computer system 100 described herein in conjunction with FIGS. 1A-1D. The broadcast provider system 215 can include similar features and functionality of client devices 102 described herein above in conjunction with FIGS. 1A-1D.

The broadcast provider system 215 can be implemented using hardware or a combination of software and hardware. In some implementations, the broadcast provider system 215 can be configured to provide cable services. The cable services can be provided via a cable distribution network or over network 210. A cable distribution network can connect the distribution source (e.g., broadcast provider system 215) to the equipment of a player (e.g., broadcast receiver devices 220). In some implementations, the connection can be a hard-wired cable network utilizing coaxial, twisted-pair, and fiber-optic, among others. In various implementations, the connection can be a wireless network utilizing a mobile network (e.g., 4G, 5G, 6G), and satellites, among others.

Additionally, the broadcast provider system 215 can include an input device that couples and communicates with the various computing devices described herein. For example, the broadcast provider system 215 may be configured to relay data received from the broadcast receiver devices 220 and/or client devices 225 to event capture system 205. In another example, the broadcast provider system 215 may receive instructions from the event capture system 205 and subsequently, communicate with each broadcast receiver device 220 of a subset of broadcast receiver devices 220 to cause a broadcast receiver device 220 to automatically schedule and record a live event associated with a wager based on instructions.

Each of the broadcast receiver devices 220 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The broadcast receiver devices 220 can include one or more computing devices or servers that can perform various functions as described herein. The one or more broadcast receiver devices 220 can include any or all of the components and perform any or all of the functions of the computer system 100 described herein in conjunction with FIGS. 1A-1D.

Each of the broadcast receiver devices 220 can include similar features and functionality of client devices 102 described herein above in conjunction with FIGS. 1A-1D. Each of the broadcast receiver devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast receiver devices 220 can include one or more computing devices or servers that can perform various functions as described herein. The one or more broadcast receiver devices 220 can include any or all of the components and perform any or all of the functions of the computer system 100 described herein in conjunction with FIGS. 1A-1D. The broadcast receiver devices 220 can include similar features and functionality of client devices 102 described herein above in conjunction with FIGS. 1A-1D.

Each broadcast receiver device 220 can include, but is not limited to, a cable box (cable converter box, or television converter box), a set-top box, a satellite receiver, a special-use PC Card device (e.g., CableCard, AllVid), a television device, a mobile device, or another type of computing device. A cable box can be a computing device configured to convert digital television signals to analog (or digital) or unscramble a television signal provided by the broadcast provider system 215 and/or event capture system 205. A set-top box can be a computing device that can be configured to enable a television or another type of computing device to receive and decode device digital television (DTV) broadcasts. A satellite receiver can be a computing device that can be configured to wirelessly (e.g., over network 210) receive and decode radio signals suitable for viewing by a player. Generally, the cable boxes, set-top boxes, and satellite receivers can be tuning devices that can transpose or convert channels from a cable television service (e.g., provided by broadcast provider system 215 or event capture system 205) to an analog (or digital) radio frequency (RF) signal. In some implementations, the broadcast receiver device 220 can be a television or another type of computing device with a converter integrated within the broadcast receiver device 220 (e.g., within a same enclosure).

Each broadcast receiver device 220 can be implemented using hardware or a combination of software and hardware. In some implementations, each broadcast receiver device 220 can be configured to receive cable services from the broadcast provider system 215. In various implementations, a broadcast receiver device 220 can include a display or display portion. Alternatively, the broadcast receiver device 220 can be configured to provide a converted signal for display on a computing device such as a client device 225

(e.g., smart phone, etc.). The display can include a display portion of a television, a display portion of a computing device, a graphical user interface (GUI), or another type of interactive display (e.g., a remote, a controller, a gamepad, a touchscreen, a display, etc.) and one or more input/output (I/O) devices (e.g., a mouse, a keyboard, digital keypad). The display can include one or more portions, for example, to display multiple in-game events as described herein. The broadcast receiver device 220 can execute one or more applications, which may display graphical user interfaces such as live event windows and/or notification windows with live content, as described herein. The display can include a border region (e.g., side border, top border, bottom border). In some implementations, the broadcast receiver device 220 can receive one or more interactions from a player (e.g., via an input device such as a remote, controller, gamepad, keyboard, or mouse, etc.). The interactions can result in interaction data, which can be stored and transmitted by the processing circuitry of the broadcast receiver device 220. The interaction data can include, for example, interaction coordinates, an interaction type (e.g., click, swipe, scroll, tap, etc.), and an indication of an actionable object (e.g., an interactive user interface element such as a button, a hyperlink, etc.) with which the interaction occurred. Each broadcast receiver device 220 can include an input device that couples or communicates with the display of each client device 225 to enable a player to interact with and/or select one or more actionable objects as described herein. The application executing on the broadcast receiver device 220 can display interactive content with live broadcasts received by the broadcast receiver device 220, and be responsive to an interaction (e.g., select, click-on, touch, hover), the application executing on the broadcast receiver device 220 can generate an indication identifying a user input and/or selection of a wager, or an in-game event, among others.

In some implementations, the broadcast receiver device 220 can be configured to convert digital television signals to analog signals and/or unscramble a television signal. Upon converting and/or unscrambling the digital television signal, the broadcast receiver device 220 can provide an output to the display in communication with broadcast receiver device 220. For example, the broadcast receiver device 220 may be an all-in-one computing device configured to receive and configure signals (e.g., from the event capture system 205) and can be configured to display (or stream) content of the television signals on an integrated display of the broadcast receiver device 220. In the following example, the broadcast receiver device 220 may be a television, a smart television, and/or an internet enabled device with a display, among others. In another example, the broadcast receiver device 220 may be a cable box (or set-top box) configured to receive and configure signals (e.g., from the broadcast provider system 215) and can be configured to display (or stream) content of the television signals on an integrated display of the broadcast receiver device 220.

In various implementations, the broadcast receiver device 220 may have memory (or storage) that can be used to store recordings. The recordings can be of broadcasts (e.g., provided by the broadcast provider system 215 and/or event capture system 205) such a live event associated with one or more schedules. The broadcast receiver device 220 can receive recording instructions from the event capture system 205 (e.g., via broadcast provider system 215, or directly via network 210) that can be executed on the broadcast receiver device 220 to schedule and record specific live events, or parts of a live event. For example, the broadcast receiver device 220 may include, or be in communication with, a digital video recorder (DVR) device, which can record video in a digital format to a non-transitory memory.

In some implementations, the broadcast receiver device 220 may be a computer-enabled television (referred to herein as a "smart television") that receives decoded broadcast content via a set top box, cable box, or a computing device that receives broadcast satellite signals (a "satellite box"). In such implementations, the broadcast receiver device 220 can receive and display broadcast content provided by the broadcast provider system 215 via the cable box, set top, or satellite box. The broadcast receiver device 220 can execute one or more applications, which may be associated with as the event capture system 205 described in greater detail herein below. The application executing on the broadcast receiver device 220 can establish one or more communication sessions with the event capture system 205 via the network 210. The application(s) can receive instructions to display notifications as described herein from the event capture system 205, which may be presented on one or more user interfaces with the broadcast content received via the cable box, set top box, or satellite box. In such implementations, the broadcast receiver device 220 can communicate with the cable box, set top box, or satellite box to perform one or more actions, such as schedule or modify a recording, or to change to a different broadcast channel.

For example, in some implementations, the instructions provided by the event capture system 205 can include instructions to present actionable objects which, when actuated, cause the broadcast receiver device 220 to schedule a recording for a broadcast of a live event (or a portion of the broadcast). In some implementations, the instructions may include instructions that cause the broadcast receiver device 220 to schedule a recording for a broadcast of a live event (or a portion of the broadcast), rather than display a corresponding notification. To do so, the smart television (e.g., the broadcast receiver device 220), may communicate a request to the cable box, set top box, or satellite box to record broadcast content (or a portion of the broadcast content) identified in the instructions. For example, the instructions may identify a particular channel or channel(s) on which the broadcast content is being displayed, a start time for the recording, an end time for the recording, or a duration of the recording. The broadcast receiver device 220 (or the application executing thereon) can send a request to the DVR, the cable box, set top box, or satellite box to navigate to schedule a recording at the identified channel for at the start time for the live event (or the portion thereof).

In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the broadcast content identified in the instructions is being provided, as well as the duration of the broadcast (or an identified portion of the broadcast). Once the channel, start time, and end time are identified, the broadcast receiver device 220 can transmit a request to the DVR, cable box, set top box, or satellite box to schedule a recording for the identified broadcast content on the identified channel at the identified start time (until the identified end time, e.g., based on the duration of the recording). The broadcast receiver device 220 can communicate with the DVR, cable box, set top box, or satellite box via any number of communication protocols, such as a Bluetooth protocol, a WiFi protocol (e.g., web-sockets), or any other type of communication protocol. The broadcast receiver device 220 can utilize one or more APIs corresponding to the DVR, cable box, set top box, or satellite box, that provide functions to schedule or modify recordings according to requests.

Each broadcast receiver device 220 can include a device identifier, which can be specific to each respective broadcast receiver device 220. The device identifier can include a script, code, label, or marker that identifies a particular broadcast receiver device 220. In some implementations, the device identifier can include a string or plurality of numbers, letters, characters or any combination of numbers, letters, and characters. In some embodiments, each broadcast receiver device 220 can have a unique device identifier. Each broadcast receiver device 220 can include a client application, which can be a live event application that communicates with the event capture system 205 to receive capture instructions described herein (sometimes referred to herein as "recording instructions"). The client application can include a user application executing on each broadcast receiver device 220 or provided to the broadcast receiver device 220 by the server 102. The application can include a web application, a server application, a resource, a desktop, or a file. In some implementations, the application can include a local application (e.g., local to a broadcast receiver device 220), hosted application, Software as a Service (SaaS) application, virtual application, mobile application, and other forms of content. In some implementations, the application can include or correspond to applications provided by remote servers or third-party servers. In some implementations, the application can access the accounts 255, the play information 260, or the capture instructions 265, stored and maintained at the database 250, and generate one or more recording instructions, such as a live event recording described herein below in conjunction with FIGS. 3A-3B, associated with a wager by a player. Such recording instructions can include instructions that cause the broadcast receiver device 220 to schedule one or more recordings of broadcast content. The instructions may include one or more API calls for recording provided by the broadcast provider system 215 to access the recording functionality of the broadcast receiver devices 220. In some implementations, the instructions can access an API provided by an application executing on the broadcast receiver devices 220 that interacts with an operating system or software layer of the broadcast provider system 215 to provide recording functionality. In various implementations, the instructions can be received, for example, by the broadcast provider system 215, and can include indications or identifiers of the broadcast receiver devices 220 to which the instructions should be transmitted.

In some implementations, one or more broadcast receiver devices 220 can establish one or more communication sessions of the event capture system 205, the broadcast provider system 215, and/or the one or more client devices 225. The one or more communication sessions can each include a channel or connection between the event capture system 205 and the one or more broadcast receiver devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data, or traffic. The communication session may be established via the broadcast provider system 215.

In some implementations, the broadcast provider system 215 can be an intermediary device between the one or more broadcast receiver devices 220 and event capture system 205. In particular, a communication session can be established between the broadcast receiver devices 220 and event capture system 205 via the broadcast provider system 215. For example, the broadcast provider system 215 can receive data (e.g., wagers, real-time live event information, messages, etc.) from the broadcast receiver device 220 via a cable distribution network or network 210. In response to receiving data the broadcast provider system 215 can route (or forward) the data to the event capture system 205 via network 210. In some implementations, the broadcast provider system 215 may analyze the data and modify various data structures such as, but not limited to, removing identifying information, removing secure information, removing financial information, adding a broadcast provider system identifier, adding profile and/or use information, etc. prior to routing the data to the event capture system 205. Furthermore, the broadcast provider system can also receive data from the event capture system 205 that can be routed to the broadcast receiver device 220 (using similar techniques described above). In various implementations, the event capture system 205 and broadcast receiver device 220 can establish a direct communication session via network 210. In some implementations, the communication session may be secure such that data can be masked by the broadcast receiver device 220 and/or broadcast provider system 215 prior to sending it to the event capture system 205.

In implementations where the broadcast receiver devices 220 can communicate via the network 210, each of the broadcast receiver devices 220 can access information resources, such as web pages via a web browser, or application resources via a native application executing on a broadcast receiver device 220. When accessing information resources, the broadcast receiver device 220 can execute instructions (e.g., embedded in the native applications, in the information resources, etc.) that cause the broadcast receiver devices 220 to display capture interfaces, such as the capture interfaces described herein below in conjunction with FIGS. 3A-3B. The capturing interfaces can be, for example, application interfaces that present information regarding one or more capturing/capture live events. In general, live events include content (e.g., images, video, animations, graphics, audio, etc.) that can be presented to a player via the input/output interfaces of a client device 225, and/or broadcast receiver device 220. In some implementations, the broadcast receiver devices 220 may be computing devices that receive broadcast content in the form of a live-stream video, for example, via the internet. Live stream videos of live events may be provided via web-based or native application interfaces, and may be received by the broadcast receiver devices 220 via one or more suitable computer networks (e.g., the network 210). In such implementations, the broadcast provider system 215 may be a provider of live stream broadcast content, and can provide the live stream broadcast content via the network 210. Similarly, in such implementations, the broadcast receiver devices 220 may be any type of computing device capable of receiving live stream content via a computer network.

In some implementations, player can make wagers on the broadcast receiver devices 220 and/or client devices 225. In response to a wager from a player, the broadcast receiver device 220 and/or client device 225 can transmit information, such as account information (e.g., changing account parameters, changing login information, etc.), interaction information, selections of wager amounts, selections of wager participation in live events, or other signals to the event capture system 205. In some implementations, the event capture system 205 can transmit a recording instructions for one or more live event based on the wager. The request can include, for example, a request to schedule a particular live event (e.g., can include a live event identifier, etc.) for recording, which can include the wager amount. The recording instructions can be a hypertext transfer protocol (HTTP or HTTPS) request message, a file transfer protocol message, an email message, a text message, or any other type of message that can be transmitted via the network 210.

In general, upon receiving a wager or an indication of an ongoing wager, an event capture system 205 can identifying a broadcast receiver device 220 corresponding to the wager. Capture instructions 265 can include one or more data structures that include any information related to an event, such as current time, current score, wager information (e.g., information about previous wagers, information about ongoing wagers), previous and ongoing recordings, other capture instructions described herein. In some implementations, the capture instructions 265 can be updated in real-time on the broadcast receiver device 220 (or client devices 225) as the live event occurs (or progresses) (e.g., as the event is processed by the event capture system 205 according to the event information 265, etc.). The indications of capture instructions 265 can include instructions that cause the broadcast receiver device 220 to schedule and/or record a specific live event based on generated instructions provided by the event capture system 205. That is, the broadcast receiver devices 220 can receive instructions from the event capture system 205 that can cause the broadcast receiver device 220 to configure one or more recordings, such as scheduling a recording associated with a television schedule (e.g., television guide, television listing, program listing, etc.). In some implementations, the television schedule may be provided by the broadcast provider system 215 and/or event capture system 205.

Figure 3A:
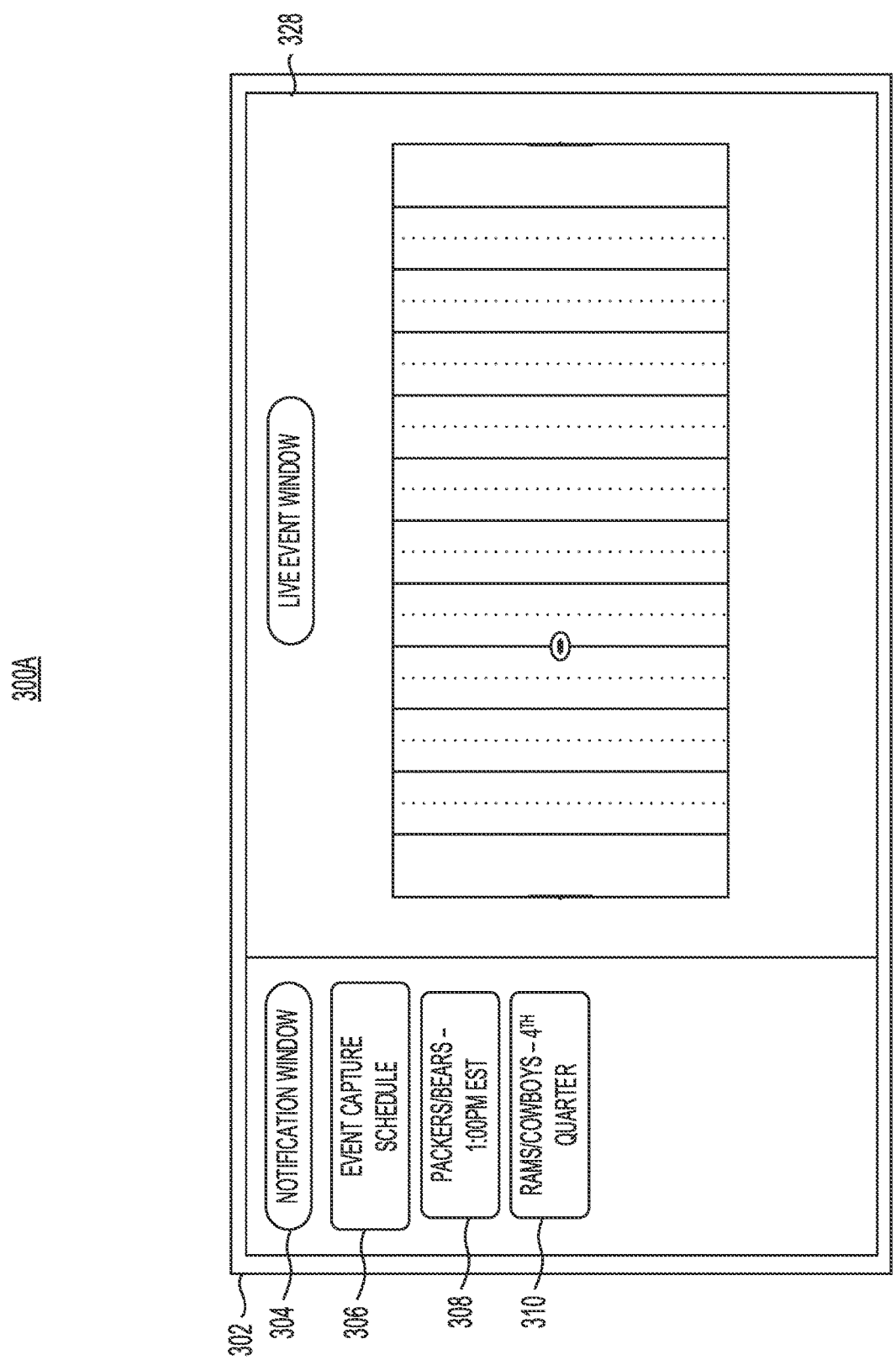

As described herein, a broadcast receiver device 220 can receive one or more instructions with objects presented on the display of the client device 225 (as shown with reference to FIG. 3A-3B). In some implementations, the objects can be interactive (e.g., actionable objects) that can be tap interactions, click interactions, or other types of indications that a user has engaged with a particular user interface element. Upon detecting an interaction with a particular user interface element, the broadcast receiver device 220 can execute instructions (e.g., processor-readable code, a script, etc.) that cause the broadcast receiver device 220 to transmit an appropriate signal to the event capture system 205, for example, via the broadcast provider system 215. A signal can include any information specified by the instructions associated with the particular actionable object with which the user interacted. The signals can include, for example, a wager, a request to stop recording a live event associated with an ongoing wager, a request to delete a recording of a live event associated with a previous wager, among others.

As described herein, a broadcast receiver device 220 and the event capture system 205 can exchange messages directly (or indirectly via broadcast provider system 215) containing information that causes a recording to be schedule for one or more live events. In some implementations, the recording instructions can be transmitted in real-time upon receiving a wager from a player. In various implementations, recording instructions can transmitted at set intervals (e.g., every minute, every hour, every day at noon, etc.). In some implementations, the recording instructions may be packaged together such that one or more recordings can be scheduled by the broadcast receiver device 220 in response to receiving the recording instructions from the event capture system 205.

The client devices 225 can include similar features and functionalities as the broadcast receiver device 220. Each of the client devices 225 can include at least one processor and a memory, e.g., a processing circuit. The memory can store processor-executable instructions that, when executed by processor, cause the processor to perform one or more of the operations described herein. The processor can include a microprocessor, an ASIC, a FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 225 can include one or more computing devices or servers that can perform various functions as described herein. The one or more client devices 225 can include any or all of the components and perform any or all of the functions of the computer system 100 described herein in conjunction with FIGS. 1A-1D. The client devices 225 can be, or can be similar to, the client devices 102 described herein above in conjunction with FIGS. 1A-1D.

Each client device 225 can include, but is not limited to, a smartphone, a mobile device, a personal computing device, or another type of computing device. Each client device 225 can be implemented using hardware or a combination of software and hardware. Each client device 225 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can include one or more portions, for example, to display in-game events, make wagers, and configure captures as described herein. The display can include a touch screen displaying an application, such as live event windows and/or notification windows described herein.

The display can include a border region (e.g., side border, top border, bottom border). In some implementations, the display can include a touch screen display, which can receive interactions from a player. The interactions can result in interaction data, which can be stored and transmitted by the processing circuitry of the client device 225. The interaction data can include, for example, interaction coordinates, an interaction type (e.g., click, swipe, scroll, tap, etc.), and an indication of an actionable object with which the interaction occurred (e.g., wager). Each client device 225 can include an input device that couples or communicates with the display of each client device 225 to enable a player to interact with and/or select one or more actionable objects as described herein. The display can enable interaction with one or more visual indications provided through the display of each client device 225, and responsive to an interaction (e.g., select, click-on, touch, hover), the client device 225 can generate an indication identifying a user input and/or selection of a wager, or an in-game event, among others.

Each client device 225 can include a device identifier, which can be specific to each respective client device 225. The device identifier can include a script, code, label, or marker that identifies a particular client device 225. In some implementations, the device identifier can include a string or plurality of numbers, letters, characters or any combination of numbers, letters, and characters. In some embodiments, each client device 225 can have a unique device identifier. Each client device 225 can include a client application, which can be a wager application and/or live event application that communicates with the event capture system 205 to view live events, make wagers, and schedule recordings described herein. The client application can include a user application executing on each client device 225 or provided to the client device 225 by the server 102. The application can include a web application, a server application, a resource, a desktop, or a file. In some implementations, the application can include a local application (e.g., local to a client device 225), hosted application, SaaS application, virtual application, mobile application, and other forms of content. In some implementations, the application can include or correspond to applications provided by remote servers or third-party servers. In some implementations, the application can access the accounts 255, the play information 260, or the capture instructions 265, stored and maintained at the database 250, and generate recording instructions, such as notifications and/or instructions to record a live event described herein below in conjunction with FIGS. 3A-3B, to a user through a client device 225. Such notifications can include actionable objects that can include user-selectable hyperlinks, buttons, graphics, videos, images, or other application features that generate a signal that is processed by the application executing on the respective client device 225.

In some implementations, one or more client devices 225 can establish one or more communication sessions between the event capture system 205, the broadcast provider system 215, the broadcast receiver devices 220, and/or the one or more client devices 225. The one or more communication sessions can each include a channel or connection between the event capture system 205 and the one or more client devices 225. The one or more communication sessions can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 225 can be computing devices configured to communicate via the network 210 to access information resources, such as web pages via a web browser, or application resources via a native application executing on a client device 225. When accessing information resources, the client device 225 can execute instructions (e.g., embedded in the native applications, in the information resources, etc.) that cause the client devices 225 to display capture interfaces, such as the capture interfaces described herein below in conjunction with FIGS. 3A-3B. The client device 225 (or the broadcast receiver devices 220) can present different types of content, such as notifications, Internet or networked live streams of live events (e.g., which may correspond to broadcasts of live events received by the broadcast receiver device 220) or other types of interactive content described herein. In general, content can include any type of media (e.g., images, video, animations, graphics, audio, etc.) that can be presented to a player via the input/output interfaces of a client device 225, and/or broadcast receiver device 220. Content, such as schedule recordings, can be displayed.

In response to interaction with user interface elements, the devices 225 can transmit information, such as account information (e.g., changing account parameters, changing login information, etc.), interaction information, selections of wager amounts, selections of wager participation in live events, or other signals to the event capture system 205. In some implementations, in response to the receiving information, the event capture system 205 can identifying a broadcast receiver device 220 and generate recording instructions for the particular broadcast receiver device to record a live event associated with the received information (e.g., wager).

As described herein, a client device 225 can receive one or more instructions with objects presented on the display of the client device 225 (as shown with reference to FIG. 3A-3B). In some implementations, the objects can be interactable (e.g., actionable objects) that can be tap interactions, click interactions, or other types of indications that a user is engaged with a particular user interface element. Upon detecting an interaction with a particular user interface element, the client device 225 can execute instructions (e.g., processor-readable code, a script, etc.) that cause the client device 225 to transmit an appropriate signal to the event capture system 205. A signal can include any information specified by the instructions associated with the particular actionable object with which the user interacted. The signals can include, for example, a wager, a request to stop recording a live event associated with an ongoing wager, a request to delete a recording of a live event associated with a previous wager, among others.

As described herein, a client device 225 and the event capture system 205 can exchange messages containing information that causes a recording to be schedule for one or more live events. In some implementations, the recording instructions can be transmitted in real-time upon receiving a wager from a player. In various implementations, recording instructions can transmitted at set intervals (e.g., every minute, every hour, every day at noon, etc.). In some implementations, the recording instructions may be packaged together such that one or more recordings can be scheduled by the client device 225 in response to receiving the recording instructions from the event capture system 205.

The database 250 can be a computer-readable memory that can store or maintain any of the information described herein. The database 250 can maintain one or more data structures, which may contain, index, or otherwise store each of the values, pluralities, sets, variables, vectors, numbers, or thresholds described herein. The database 250 can be accessed using one or more memory addresses, index values, or identifiers of any item, structure, or region maintained in the database 250. The database 250 can be accessed by the components of the event capture system 205, or any other computing device described herein, via the network 210. In some implementations, the database 250 can be internal to the event capture system 205. In some implementations, the database 250 can exist external to the event capture system 205 and may be accessed via the network 210. The database 250 can be distributed across many different computer systems or storage elements and may be accessed via the network 210 or a suitable computer bus interface. The event capture system 205 can store, in one or more regions of the memory of the event capture system 205, or in the database 250, the results of any or all computations, determinations, selections, identifications, generations, constructions, or calculations in one or more data structures indexed or identified with appropriate values. Any or all values stored in the database 250 may be accessed by any computing device described herein, such as the event capture system 205, to perform any of the functionalities or functions described herein. In some implementations, the database 250 can be similar to or include the storage 128 described herein above in conjunction with FIG. 1C. In some implementations, instead of being internal to the event capture system 205, the database 250 can form a part of the cloud computing system of FIG. 1B. In such implementations, the database 250 can be a distributed storage medium in a cloud computing system and can be accessed by any of the components of the event capture system 205, by the broadcast provider system 215, the broadcaster receiver devices 220 (e.g., via the player interface similar to that depicted in FIGS. 3A-3B, etc.), or the client devices 225, or any other computing devices described herein.

The database 250 can store one or more accounts 255 (sometimes referred to herein as "player profiles") associated with a player of a broadcast receiver device 220 and/or a client device 225. The account 255 can be a player profile that includes information about a player and information about one or more broadcast receiver devices 220 and/or one or more of the client devices 225 used to access the event capture system 205 using the account 255. For example, identifiers of an account can be used to access the functionality of the event capture system 205. The identifiers can include a username, a password, an e-mail address, a phone number, a personal identification number (PIN), a secret code-word, device identifiers for use in a two-factor authentication technique, among others. The account 255 can store information about wagers (e.g., historical, ongoing, etc.), events, and notifications that are provided by the live system 205. The account 255 can store a credit balance, wager information (e.g., an amount of a wager, a timestamp associated with a wager, information about broadcast receiver devices 220 including historical device data associated with previously viewed events, a client device identifier of a client device 225 or a broadcast receiver device 220 that was used to place the wager, a broadcast receiver device identifier of a device that was used to place the wager or presented a notification, a broadcast provider system 215 identifier that provides one or more services to the account, etc.). The account 255 can store information about a client device 225 or a broadcast receiver device 220 used to access the event capture system 205 such as an IP address, a MAC address, a GUID, an account name (e.g., the name of a user of the client device 225, etc.), device name, among others. The account 255 may include one or more broadcast receiver devices 220 used by the player. In some implementations, an account 255 can be created by the event capture system 205 in response to an account creation request transmitted by a client device 225. The account creation request can include any of the account information described herein.

The database 250 can store or maintain play information 260 associated with each of the one or more accounts 255. The play information 260 can include event information for event previously viewed and/or wagered, or currently viewing and/or wagering, by a client device 225 and/or broadcast receiver device 220 having a corresponding account 255. In some implementations, a client device 225 accessing the event capture system 205 may not be associated with an account 255. In such implementations, the event capture system 205 can automatically create an account 255 using an identifier of the client device 225 provided by the client device 225 and/or an identifier of the broadcast receiver device 220 provided by the broadcast provider system 215 and/or broadcast receiver device 220. The play information 260 can include information about previous wagers, actions, interactions, or other data provided by the devices described herein (e.g., 215, 220, 225) during the interaction with an event (e.g., viewing, wagering, selecting, etc.) provided by the event capture system 205. The play information 260 can maintain an event state of one or more event (e.g., before the event, during the event, and after the event). As described herein, the event state can include one or more data structures that include any information related to an event state, such as current time remaining, timeouts left, wager information, stoppages, injuries, information about whether the user has indicated a desire to participate in wager opportunities (e.g., select a notification while viewing a different event), event statistics, or other event state data described herein. In some implementations, the indications of the event state can be received as an event as the game occurs (e.g., as the event is processed by the event capture system 205 according to the capture instructions 265, etc.). The event state can include options that a user may take at each portion of an event, and any actions (e.g., interactions, pausing/waiting for a particular duration at stored timestamps, etc.) the broadcast receiver device 220 and/or client device 225 takes in response to said options.

The database 250 can store or maintain capture instructions 265. As used herein, an "event" may be any occurrence of a live event broadcast such as, but not limited to, a competition or game. In some embodiments, each competition and/or game may have one or more events during play (e.g., entirety of game, first quarter, second period, any time period, among others). For example, a football game may have a first event that is the entire game, a second event that is the second quarter, and a third event that is the time period between the last two minutes of the fourth quarter. The capture instructions 265 can include instructions to record content of events described herein (e.g., recording instructions). The capture instructions 265 can include one or more notification that are provided in response to a wager received. In short, the capture instructions 265 can include instructions to capture live event content from start to finish (or for a particular time period) and scheduling records on broadcast receiver devices 220 directly (e.g., via network 210) and/or indirectly (e.g., via broadcast provider system 215). The capture instructions 265 can be stored in one or more data structures that are indexed by an event name (e.g., Packers v. Bears, Jets v. Giants, Knicks v. 76ers, Yankees v. Astros, any other event, etc.), by wager identifier (e.g., wager 459393430, wager 459393431, wager 459393432, etc.), or by broadcast receiver device identifier (e.g., JK7BN, IU5FB, MC0VA, etc.). The capture instructions 265 can be processor executable instructions that cause the event capture system 205 to provide one or more instructions and/or content (such as notifications and schedules) to a broadcast receiver device 220, via a communication session. In some implementations, the capture instructions 265 can include artificial intelligence models (e.g., machine learning models, neural network, decision trees, ruled-based lookup table, etc.) that cause the event capture system 205 to provide recording instructions for events associated with one or more wagers.

The capture instructions 265 can include odds information, which can be stored as probability values of certain in-game events occurring. The odds information can be altered based on actions taken by the player. The odds information can reflect a particular expected outcome (e.g., an expected value of player loss, an expected value of player win, etc.). The event capture system 205 can use the capture instructions 265 to update the event state in the play information 260 by monitoring a live event as the live event is played, viewed, and/or recorded by the broadcast receiver device 220. In various implementations, viewership and number of recordings can be determined based on receiving statistic data from the broadcast provider system 215 indicating the number of broadcast receiver devices 220 viewing and/or recording one or more particular events. In some implementations, the capture instructions 265 can update the odds information in response to an indication of a wager. The capture instructions 265 can include descriptions of events or event criteria that can activate (e.g., provide, etc.) recording instructions. For example, during a football game, the event capture system 205 can detect a wager, and determine to provide a recording instructions to each of the broadcast receiver devices 220 associated with the account of the player that wagered, that can cause the broadcast receiver devices 220 to initiate a recording of a broadcast of the live event. In another example, during a basketball game, the event capture system 205 can detect one or more wagers, and determine to provide recording instructions to each of the broadcast receiver devices 220 associated with each account of the players that wagered, that can cause each broadcast receiver device 220 to initiate a recording of a broadcast of the live event. The recording instructions can specify the conditions under which the recording should occur and/or if any alerts should be provided to the player. Each of the components of the event capture system 205 can access, update, or modify the accounts 255, the play information 260, or the capture instructions 265, to carry out functionalities described herein. In various implementations, the capture instructions 265 can include API calls for communicating with the broadcast provider system 215, API calls for communicating with the broadcast provider devices 220, and API calls for executing an application on the broadcast provider devices 220 that can cause recordings to be scheduled. In some implementations, the broadcast receiver devices 220 can maintain some or all of the capture instructions 265, which may correspond to or include API function calls for DVRs, cable boxes, set top boxes, or satellite boxes.

Referring now to the operations of the event capture system 205, the wager analyzer 230 can access and identify wagers related to a live event. The one or more wagers can be provided by the broadcast receiver devices 220 or the client devices 225, and may include an identifier of a live event, a message type, or information related to a condition or moment that occurred or could occur in the live event. In some implementations, wagers can be transmitted by the broadcast provider system 215 215 (e.g., where the broadcast receiver devices 220 communicate with the event capture system 205 via the broadcast provider system 215), the broadcast receiver devices 220 directly (e.g., via the network 210), and/or the client devices 225, and can include one or more wagers associated with a live event broadcast.

In some implementations, one or more of the wagers can include an identifier of a live event broadcast. Each wager can indicate a corresponding broadcast receiver device 220 from which the wager was transmitted that is receiving the live event broadcast from the broadcast provider system 215 (or directly from event capture system 205) and can include event information of a live event broadcast. In some implementations, the wagers can be identified from communications transmitted by one or more of the client devices 225. In particular, wagers for events can be made on an application of the client devices 225 and can be transmitted to the live event system 205 for analysis. In response to receiving the wager, the live event system 205 can automatically generate recording instructions for the event and transmit the instructions (e.g., which may include API calls, or other instructions as described herein) to the broadcast receiver device 220 (e.g., which may be an application executing on a smart television, etc.)

In various implementations, the wager analyzer 230 can access the messages via one or more content sources (e.g., broadcast provider system 215). Upon receiving and/or accessing the messages, the receiver analyzer 235 can determine to identify at least one broadcast receiver device 220 associated with the player that made a wager. In particular, one or more broadcast receiver devices 220 may be registered with the player and can be stored in accounts 255 and can include device identifiers and communication information (e.g., IP address, MAC address, service provider information, etc.) related to the broadcast receiver devices 220, such that when a wager is identified by the wager analyzer 230, the received analyzer can identify a broadcast receiver device 220 associated with the player that made the identified wager.

In various implementations, the receiver analyzer 235 can identify one or a subset of broadcast receiver devices 220 to provide instructions to record the live event associated with the identified wager. That is, the receiver analyzer 235 can identify the broadcast receiver device 220 based on account 255 and play information of the live event stored in database 250. Additionally, the identified broadcast receiver device 220 can be identified based on one or more attributes of each player profile of the plurality of player profiles stored in accounts 255.

In some implementations, the instruction generator 240 can generate recording instructions for the broadcast receiver device 220 based on identifying the broadcast receiver device 220 from a wager. satisfying the notification transmission policy. The recording instructions can include, for example, API instructions to communicate with an application of the broadcast receiver device 220 to cause a recording to be scheduled (e.g., via a DVR, cable box, set top box, satellite box, etc.). In some implementations, the instructions can include actionable and information objects for display on the broadcast receiver device 220 informing the user of a scheduled recording and/or ongoing recording. In implementations where the broadcast receiver devices 220 are cable boxes, set top boxes, or satellite boxes, and as described herein above, the broadcast receiver devices 220 can receive recording instructions from a broadcast provider system 215, for example, via a proprietary broadcast network. In conventional broadcast systems, broadcast receiver devices 220 cannot automatically schedule recordings based on a wager or other indication made by the player. The system 200 is an improvement over these conventional systems because the event capture system 205 can generate instructions that cause an application executing on the broadcast receiver device 220 to automatically schedule a recording of an identified live event (or portion thereof).

The instructions generated by the instruction generator 240 and transmitted by the capture communicator 245 can be received, for example, by the broadcast provider system 215, and can include indications or identifiers of the broadcast receiver devices 220 to which the recording instructions are directed. The recording instructions can include one or more API calls for scheduling a recording. In some implementations, the instructions can include instructions to display notifications at the broadcast receiver device with live content, and can include one or more scripts that cause the actionable and information objects to be actionable, as described herein. In some implementations, the instruction generator 240 can generate the instructions based on a determined type of broadcast receiver device 220 (e.g., broadcast receiver device X can use API calls X to schedule a recording, broadcast receiver device Y can use API calls Y to schedule a recording, broadcast receiver device Z can use API calls Z to schedule a recording, etc.). For example, a cable box may require a different type of instructions than a set top box, or a cable box that receives a satellite signal via a satellite dish. To accommodate for different types of broadcast receiver devices 220, the instruction generator 240 can maintain sets of templates for each type of broadcast receiver device 220. Similarly, the broadcast receiver device 220 (e.g., if the broadcast receiver device 220 is a smart television) may maintain or store API calls for a variety of DVRs, cable boxes, set top boxes, or satellite boxes.

Once generated, the capture communicator 245 can transmit the recording instructions to the broadcast receiver device 220, causing the broadcast receiver device 220 to schedule a recording, as described herein. In some implementations, the capture communicator 245 can transmit the recording instructions to the broadcast provider system 215. The instructions can include, for example, indications of the one or more broadcast receiver devices 220 that are to receive the recording instructions. Upon receiving the recording instructions from the capture communicator 245, the broadcast provider system 215 can identify the one or more broadcast receiver devices 220 (e.g., destinations) as indicated in the instructions, and transmit the recording instructions to each of the destination broadcast receiver devices 220. The application executing on the broadcast receiver device 220 can receive the recording instructions and use one or more API calls to schedule a recording. It should be understood that any other functionality as described herein can be carried out by the broadcast receiver device 220 via the application or the recording instructions. Similarly, if an application executing on the broadcast receiver device 220 (e.g., which may be a smart television), receives the recording instructions, the application can identify a corresponding DVR, cable box, set top box, or satellite box in communication with the broadcast receiver device 220, and schedule a recording in accordance with the instructions at the DVR, cable box, set top box, or satellite box, as described herein.

In some implementations, the capture communicator 245 can provide the broadcast receiver devices 220 (e.g., via the broadcast provider system 215) instructions to schedule and record live events with notification instructions, which cause the broadcast receiver device 220 to display a notification of a recording associated with the identified wager. In some implementations, the instructions can be directed to the broadcast provider system 215, which can send corresponding signals to identified broadcast receiver devices 220 to schedule a recording for a broadcast identified in the instructions (e.g., via one or more APIs, etc.). The event capture system 205, via the capture communicator 245, can establish a communication session with the broadcast receiver device 220 to provide (or transmit) the recording instructions.

Referring briefly now to FIG. 3A, depicted is an example live event broadcast 300A displayed on a broadcast receiver device, such as the broadcast receiver device 220, the client device 225, or another computing device described herein. The live event broadcast 300A can include a display device 302 that includes a live event window 328 and a notification window 304. The display device 302 may be a broadcast receiver device 220 and/or client device 225. In some implementations, the notification window 304 may be presented and the live event window 328 may be adjusted (e.g., automatically re-dimensioned to fit the notification window 304) based on receiving recording instructions to display a notification identifying one or more live events scheduled for recording. In various implementations, the recording instructions may be received from the broadcast provider system 215 (e.g., via a cable distribution network or network 210) and/or from event capture system 205 (e.g., via network 210).

As shown in the FIG. 3A, the live event broadcast 300A can include actionable objects (e.g., 308, 310) that can be interacted with (e.g., selected, clicked) depicting scheduled recording. The player can interact with one or more of the recording actionable objects to view the recording schedule and the one or more wagers associated with the scheduled recording. For example, a player may select actionable object 308 to review the scheduled recording of the Packers/Bears live. In another example, a player may select actionable object 310 to adjust (e.g., increase, decrease) a wager amount prior to the scheduled recording. In some implementations, it should be understood that the presented notifications (e.g., FIG. 3A-3B) may be for one or more live events and the depictions of the notification window 304 in the live event broadcast 300A are purely example notifications, and other configurations including other content, such as notifications for one or more recordings with corresponding wagers are possible. Furthermore, in various implementations, it should be understood that a wager may be any asset of value such as, but not limited to, fiat currency, digital currency, cryptocurrency, credits (e.g., distributed by event capture system 205), coupons, among others.

Additionally, the live event broadcast 300A can include information objects (e.g., 306) that can be configured to provide content via display device 302. It should be understood that the labels, elements, objects, locations, and depictions of the live event broadcast 300A are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection to the event capture system 205, as described herein.

Referring back now to FIG. 2, the wager analyzer 230 can access one or more messages that can include, but are not limited to, one or more wagers associated with one or more live events. The wager analyzer 230 can utilize one or more application programming interfaces (API) to access wagers from the broadcast receiver devices 220, the client devices 225, and/or broadcast provider system 215. For example, various devices such as broadcast receiver devices 220 and client devices 225 can execute an application to make a wager. The wager may be stored on the various devices and the wager analyzer 230 may periodically (or in real-time) access the storage of the various devices (e.g., 220, 225) to determine if a wager occurred. Accessing storage can include querying one or more data storages. In particular, the facilitation of communication can be implemented as an application programming interface (API) (e.g., REST API, Web API, customized API), batch files, SDK, and/or queries. In various implementations, the event capture system 205 can also be configured to control access to resources of the event capture system 205 and database 250. In some implementations, the wager analyzer 230 can generate identifiers for wagers such that each wager can be unique. In various implementations, as players make wagers, the event capture system 205 can receive an identifier associated with the wager and data associated with the wager (e.g., wager amount, wager type, live event, broadcast or event schedule, etc.).

One or more APIs can be used by the event capture system 205 (e.g., in particular, the wager analyzer 230) and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC). As such, EDI messages may be implemented in any of the above or using another suitable technology. In some implementations, the communication session (e.g., via an API) can be established between the live event system 205 and broadcast provider system 215 and periodically (or in real-time) the data received from the broadcast receiver devices 220 can be batched and sent to the live event system 205 using an EDI messages.

In some implementations, the receiver analyzer 235 can access accounts 255 and/or wagers (e.g., from wager analyzer 230) that can include, but are not limited to, one or more broadcast receiver device identifiers associated with one or more client devices 225 (e.g., client device identifiers) and/or broadcast provider system 215 (e.g., client device identifiers). The receiver analyzer 235 can utilize one or more application programming interfaces (API) to access identifiers and communication information (e.g., IP address, geographic location information, broadcast provider service, network protocol, etc.) from the broadcast receiver devices 220, broadcast provider system 215, client devices 225, and accounts 255 in database 250. In particular, the facilitation of communication can be implemented as an application programming interface (API) (e.g., REST API, Web API, customized API), batch files, SDK, and/or queries. In various implementations, each client device 225, broadcast receiver device 220, wager, and live event can have a unique identifier. For example, each client device 225 may have a unique identifier that follows the following format, CD-XXXXX, where the X's are randomly generated by the event capture system 205 (e.g., CD-45GB6, CD-9838H, etc.). However, it should be understood that this example is non-limiting and that other unique identifiers for the client devices 225 are possible (e.g., MAC address, GUID, etc.). In another example, each broadcast receiver device 215 may have a unique identifier that follows the following format, BRD-XXXXXXX, where the X's are randomly generated by the event capture system 205 (e.g., BRD-76NX81B, BRD-MKFIZB5, etc.). However, it should be understood that this example is non-limiting and that other unique identifiers for the broadcast receiver devices 220 are possible (e.g., MAC address, GUID, etc.). It should be understood that each identifier can follow any format that can uniquely identify each device, wager, and/or live event.

The instruction generator 240 can generate recording instructions that can include API calls for communicating with an application on the broadcast receiver device 220 that can execute instructions to schedule a recording. In some implementations, the recording instructions may be unique to the type of broadcast receiver device 220. Additionally, the instruction generator 240 can utilize a broadcast schedule of live event to determine the instructions for transmitting. In particular, the broadcast schedule can be received form the broadcast provider system 215, broadcast receiver device 220, and/or a client device 225. In various implementations, when recording instructions are generated, the capture communicator 245 may communicate with the identified broadcast receiver device 220 of the identified wager. The communication may be in the form of a client message including recording data to configure the broadcast receiver device 220 to capture and store recording of a live event. The captured recording can be stored as recording data in the capture instructions 265 and/or in accounts 255. In some implementations, the recording instruction can cause the display of the broadcast receiver device 220 and/or client device 225 to display a notification indicating a recording has been set.

In various implementations, the player can configure when recording instructions can be generated by instruction generator 240 and transmitted by capture communicator 245. For example, based on the type of wager (e.g., parlay, above $50, money line) or client message (e.g., entire games, less than 10-minute recording, designated teams), the instruction generator 240 can generate instructions if the type of wager or message satisfies a player's configuration. The configurations can be stored in accounts 255 and queried by the instruction generator 240. The recording instructions 265 can include one or more checks such as, but not limited to, prompting the instruction generator 240 to query the configuration stored in accounts 255 prior to generating recording instructions for a broadcast receiver device 220. In some implementations, the player can update configuration in real-time. In some implementations, the player configuration may indicate that no recordings should be scheduled for the player's wagers.

In some implementations, the recording instructions generated by the instruction generator 240 are for recording a critical moment (e.g., wager on a particular player, wager on a particular team to win, wager on a particular event) or period of time corresponding to the wager. For example, if the player wagers on the 4th quarter of a football game, the recording instructions will schedule a recording for only the 4th quarter. In another example, if the wager is on a team to win, the recording instruction will schedule a recording for the final few moments of the game (e.g., last minute, last 5 seconds, etc.). Additionally, the player can configure in their player profile (or account settings) what period of time they would like recorded associated with a wager. For example, the user may configure recording of moments to be 15 seconds before and after the moment. In another example, the user may configure recordings of the end of game to start when there is 30 second left. In some implementations, the attributes of the recording (e.g., what portion of the live event to record, whether to record the live event, etc.) can be specified on a per-wager basis (e.g., with each wager, etc.).

Referring now to FIG. 3B, depicted is an example live event broadcast 300B displayed on a broadcast receiver device, such as the broadcast receiver device 220, the client device 225, or another computing device described herein. The live event broadcast 300B can include similar features and functionalities of FIG. 3A. The live event broadcast 300B can include a display device 302 that includes a live event window 328. The display device 302 may be a broadcast receiver device 220 and/or client device 225. In some implementations, a notification may be presented (or overlayed) within live event window 328 based on receiving recording instructions to schedule a recording of a live event. In various implementations, the notification may be for a live event currently recording. Alternatively, the notification may be for a live event scheduled to be recorded. The instructions to present the notification and one or more actionable objects can be received from the broadcast provider system 215 (e.g., via a cable distribution network or network 210) and/or from event capture system 205 (e.g., via network 210).

As shown in the FIG. 3B, the live event broadcast 300B can include actionable objects (e.g., 312) that can be interacted with (e.g., selected, clicked) depicting a recording notification. The player can interact with one or more of the actionable objects to view wagers and the recording schedule. For example, a player may select actionable object 312 to view the current one or more wagers on the Mets/Yankees live event. Additionally, it should be understood that the labels, elements, objects, locations, and depictions of the live event broadcast 300B are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the event capture system 205, as described herein. After which, a credit balance can be deducted.

Referring back to FIG. 2, in various implementations described herein, content can be provided to the broadcast receiver devices 220 by the event capture system 205 or broadcast provider system 215 in one or more feeds of content. The feeds of content may include content items that indicate updated start times of live events, content items that indicate information relating to wagers placed on the live events, content items relating to wagers placed on the live event (e.g., wagers that identify a player profile associated with the broadcast receiver device, other wagers placed on the live event, etc.), and content items that indicate detected conditions of live events (e.g., changes in score, points, plays that occur during the live events, etc.), among others.

The event capture system 205 can detect the outcomes of wagers by monitoring the conditions of the live events identified by the wagers. Detecting the outcomes of wagers can including retrieving or monitoring an external repository that maintains a record of occurrences in the live events or a record of the state of a live event that indicates various conditions of the live events on which wagers can be placed. Detecting the outcomes of wagers can include polling one or more remote computing devices, which may be operated by persons that are present at a live event. In some implementations, user input can be provided at the remote computing devices to indicate an update to a state of the live event, or to indicate an outcome of one or more wager conditions. The indications can be recorded by the remote computing device, which can transmit with the indications to the event capture system 205. Based on the indications, the event capture system 205 can determine whether one or more wagers have been closed by evaluating the conditions in each wager against the updated state provided by the remote computing device. In implementations where the remote computing devices themselves indicate an outcome of a wager, the event capture system 205 can detect the outcome of wagers by parsing the indications. In some implementations, the event capture system 205 can detect outcomes wagers based on the changes in the state (e.g., in-game time, score, one or more plays, or status of a live sporting event, etc.) of the live event.

The event capture system 205 can update the status of the wagers based on the detected outcomes by recording the outcomes of the wagers in the database. Upon detecting an outcome of a wager, the event capture system 205 can generate a content item that includes an indication of the wager outcome, and can display the content item on a broadcast receiver device 220 with a broadcast of a live event, as described herein. In some implementations, the content item can include instructions that cause the broadcast receiver device to navigate to the live event on which the wager was placed (e.g., change the channel being displayed). The outcomes of wagers may also be utilized in connection with the various techniques described herein.

The event capture system 205 may receive or update permissions to display one or more content items (e.g., in the user interfaces shown in FIGS. 3A-3C) with live content. For example, the broadcast receiver devices 220 can perform an opt-in process to authorize the display of one or more content items with broadcasts of live events. The opt-in process may include providing a code, which a user of the broadcast receiver device 220 can scan using a second device (e.g., a smartphone, a tablet computer, etc.). Scanning the code can cause the second device to navigate (e.g., via a web-browser or native application deep-link) to a URL embedded in the scanned code. The code including the URL can be generated in response to a corresponding interaction with a button or user interface element presented by the application executing on the broadcast receiver device 220, to initiate the opt-in process. The URL can cause the second device to navigate to a landing page (e.g., a user interface) provided by the event capture system 205 that accepts authentication credentials corresponding to a player profile. Once the authentication credentials have been entered, the event capture system 205 can verify the authentication credentials, and provide a second page (e.g., a user interface) that enables the user to modify permissions for presenting content with live events on the broadcast receiver device 220 that presented the code. In some implementations, one or more of the landing page that accepts authentication credentials and the second page that enables the user to modify the permissions can be navigated to and displayed on the broadcast receiver device 220.

The second page that enables the user to modify permissions for presenting content with live events on the broadcast receiver device 220 that presented the code can include one or more selectable user interface elements that enables selection of whether content can be displayed in connection with live broadcasts on the broadcast receiver device. The selectable user interface elements can enable or disable the display of certain types of content items (e.g., wagers, messages from other players, etc.). The selectable user interface elements can be used to specify time period restrictions during which content items are not displayed on the broadcast receiver device 220 with live content. The selectable user interface elements can be used to specify time period restrictions during which content items are not displayed on the broadcast receiver device 220 with live content. The updates to the permissions can be stored in association with an identifier of the broadcast receiver device 220, and can form a part of one or more selection policies to select content for the broadcast receiver device 220.

Content items, such as the content items (sometimes referred to as alerts or notifications) shown in FIGS. 3A-3C, can be displayed by an application that executes on the broadcast receiver device 220. As described herein, the broadcast receiver device 220 can include memory that can store processor-executable instructions. The processor-executable instructions can include the application. To launch the application, a player can access a menu provided by an operating system or other low-level software of the broadcast receiver device 220. The menu can include an interactive user interface element that launches the application, or causes the application to present a visible user interface (e.g., one or more of the interfaces described in connection with FIGS. 3A-3C, etc.). Various additional user interface elements can be displayed by the application that enable navigation between different views, windows, content items, or user interfaces of the application.

As described herein, one or more of the content items provided to and displayed by the broadcast receiver device 220 with live content can be interactive content items. The interactive content items can include buttons, hyperlinks, graphics, or other types of interactive user interface elements that cause the broadcast receiver device 220 to perform one or more operations. For example, the content item can include (e.g., in metadata of the content item) processor-executable instructions, interpretable scripts or code, or an identifier of an operation to perform. Upon an interaction with the content item, the broadcast receiver device 220 can perform the various operations specified by the metadata of the content item. Example operations including navigating to a live broadcast indicated in the content item, placing a wager on a live event, modifying player profile attributes, request additional or alternative content to display with a current or alternative broadcast, or other operations described herein. In an example embodiment, upon an interaction with a content item that causes the broadcast receiver device 220 to navigate to a live broadcast, the broadcast receiver device 220 can transmit a request for content items to the event capture system 205, which can provide corresponding content items for display with the live broadcast in response to the request. In another embodiment, the broadcast receiver device 220 can navigate to the live broadcast indicated in the content item without requesting content items for display.

Figure 4:
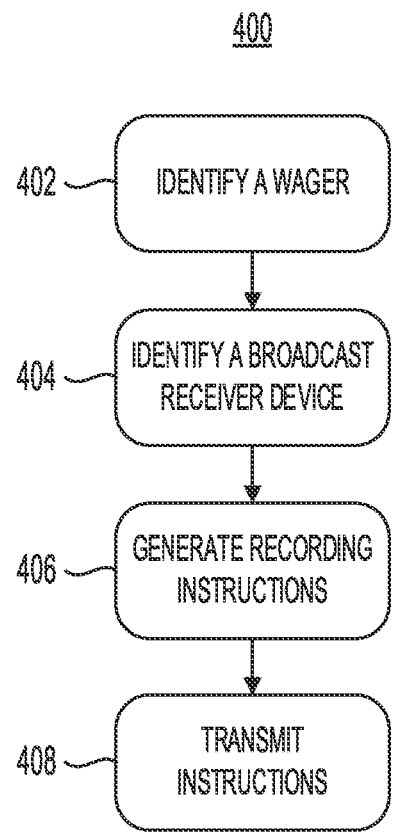
FIG. 4 illustrates an example flow diagram of a method for providing event capture system functionalities, in accordance with one or more implementations.

Referring now to FIG. 4, depicted is an illustrative flow diagram of a method 400 for controlling computer recorded data based on client messages. The method 400 can be executed, performed, or otherwise carried out by the event capture system 205, the computer system 100 described herein in conjunction with FIGS. 1A-1D, or any other computing devices described herein. In brief overview of the method 400, the event capture system (e.g., the event capture system 205, etc.) can identify a wager (STEP 402), identify a broadcast receiver device (STEP 404), generate recording instructions (STEP 406), and transmit instructions (STEP 408).

In further detail of the method 400, the event capture system (e.g., the event capture system 205, etc.) can identify a wager corresponding to a live event associated with a client device (STEP 402). A wager can include, but is not limited to, money line bets, straight bets, proposition (or prop) bets, teaser bets, among others. In some implementation, the wager can be identified after receiving a request to record live events corresponding to wagers associated with the client device. The request can include one or more wagers associated with one or more live events. In some implementations, the request may include device identifiers and/or account information identifying the origin of the messages (e.g., client devices 225, broadcast receiver devices 220). Additionally, the requests may include live event information such as, statistics of the live event. In some implementations, a wager may correspond to a portion of the live event. For example, the player may wager on the fourth quarter of a football game, or the second half of a soccer game. In the following examples, the wager identified may be associated with a game play time period (e.g., stored in play information 260), such that when the recording instructions are generated in STEP 406, the recording instructions may initiate a recording of only the portion of the live event corresponding to the wager.

The event capture system can identify a broadcast receiver device corresponding to the client device (STEP 404). In some implementations, the event capture system can maintain a data structure storing an association between an identifier of the wager, an identifier of the client device, and an identifier of the broadcast receiver device corresponding to the client device. For example, the data structure may be stored in a database (e.g., database 250) in the account (e.g., accounts 255) of the player. In the following example, each wager may have a unique identifier (e.g., GB6YH2), a unique client device identifier (e.g., 340959208560194), and a unique broadcast receiver device identifier (e.g., BRD-0949839). In various implementations, the player may have a data structure that includes an association of with more than one wager identifier, client device identifier, and broadcast receiver device identifier such that one wager identifier associated with a player may be associated with two client device identifiers and five broadcast receiver device identifiers.

In various implementations, the event capture system can determine that the broadcast receiver device is authorized to record the broadcast of the live event. For example, the event capture system may determine equipment information (e.g., type of display, device capabilities), account information (e.g., account credentials, adults-only access, kid access, preferences), etc. In some implementations, the broadcast receiver device can be identified from a user profile used by the client device to communicate with the one or more processors. For example, each user profile may have enrolled or registered broadcast receiver devices that can be authorized and/or configured to capture live events.

The event capture system can generate recording instructions for the broadcast receiver device that cause the broadcast receiver device to initiate a recording of a broadcast of the live event (STEP 406). In some implementations, the recording instructions can be generated in response to determining a broadcast schedule of the live event based on information received from the broadcast receiver device. Alternatively, the recording instructions can be generated in response to determining a broadcast schedule of the live event based on information received from a third-party data source (e.g., news feeds, social media, broadcast provider system 215, internet content, among others). Accordingly, the generated recording instructions can be based on the broadcast schedule of the live event. For example, after identifying a wager and broadcast receiver device, the event capture system can request (e.g., from broadcast provider system 215, broadcast receiver device 220, third-party data sources, etc.) or access (e.g., from play information 260) one or more broadcast schedules and search the broadcast schedules to identify the live event associated with the wager.

The event capture system can determine when a particular portion of a live event that corresponds to a wager placed by a player, as described herein, and subsequently generate recording instructions as described herein to record that moment at a corresponding broadcast receiver device. In some implementations, the event capture system may record portions of a live event that correspond to a critical moment (e.g., a critical event), which may be identified as the last moments of a quarter in a football game, when a score is tied, or when a large influx of messages corresponding to the live event are detected. The event processing system can monitor signals related to the live event (e.g., live event content, scheduling information from one or more data sources, etc.).

In some implementations, generating the recording instructions is responsive to a request to record live events corresponding to wagers associated with a client device. For example, instead of the live event capture system identifying a wager (as described in STEP 402), the recording instructions can be automatically generated in response to receiving a request to record a live event associated with a wager.

In various implementations, upon making a wager, a message (sometimes referred to herein as a "client message") may be sent to the event capture system that includes the wager and the live event of the wager. For example, the event capture system 205 may receive an indication of a wager every time the player makes a wager. In the following example, the player may set one or more preferences (e.g., in accounts 255) that indicate the event capture system should record certain wagers based on various parameters (e.g., any wager above $50 should be recorded, any wager based on the entire game should be recorded, etc.). In some implementations, the recording instructions for the broadcast receiver device can include generating a notification for display by the broadcast receiver device that indicates the recording of the broadcast of the live event has been scheduled. Accordingly, the request to record a live event can be included (e.g., as data) in wagers corresponding to live event. In some implementations, the recording instructions may be for a portion of the live event corresponding to the wager. Additionally, the recording instructions may include instructions to store the recording (e.g., recording data) on the broadcast receiver device 220. For example, the recording instructions could include a file location designation in a storage device of the broadcast receiver device (e.g., or cloud, or client device 225). The recorded live event can be stored as recorded data for playback by the player in a suitable storage.

The event capture system can transmit recording instructions to the broadcast receiver device to cause the broadcast receiver device to schedule a recording for the broadcast of the live event (STEP 408). As shown in FIGS. 3A-3B, the instructions can include various styling information and live event information that can cause the display device (e.g., the broadcast receiver device 220 and/or client device 225) to display a notification indicating an event is scheduled to be captured (or recorded). The recording instructions can be stored in a client message that can include the styling information and live event information as well. In some implementations, the notification can include actionable objects that causes a broadcast receiver device displaying the notification to display a broadcast of the live event.

In various implementations, the recording instructions can cause the broadcast receiver device 220 to execute API calls to an application of the broadcast receiver device 220 to schedule a recording. The recording instructions can include parameters for the recording including the time length, the event, etc. Additionally, the API calls can return a successful or failure indicating if the recording was scheduled. The return of the API calls can be transmitted to the event capture system 205. In some implementations, the API calls may be unique to the broadcast receiver device 220 such that the API calls are specific to the hardware and application of the broadcast receiver device 220.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the event capture system 205 can include clients and servers. For example, the event capture system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the event capture system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connec- tion with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including one or more these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for extracting parameters from invoices using a cloud computing system, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
identifying, by one or more processors coupled to memory, a wager corresponding to a live event associated with a client device, the wager comprising a request to record a broadcast of the live event;
identifying, by the one or more processors, a broadcast receiver device corresponding to the client device;
generating, by the one or more processors, recording instructions for the broadcast receiver device that cause the broadcast receiver device to initiate a recording of the broadcast of the live event; and
transmitting, by the one or more processors, the recording instructions to the broadcast receiver device to cause the broadcast receiver device to schedule a recording for the broadcast of the live event.

2. The method of claim 1, further comprising:
determining, by the one or more processors, a broadcast schedule of the live event based on information received from the broadcast receiver device; and
wherein generating the recording instructions for the broadcast receiver device is further based on the broadcast schedule of the live event.

3. The method of claim 1, further comprising:
determining, by the one or more processors, a broadcast schedule of the live event based on information received from a third-party data source; and
wherein generating the recording instructions for the broadcast receiver device is further based on the broadcast schedule of the live event.

4. The method of claim 1, further comprising maintaining, by the one or more processors, a data structure storing an association between an identifier of the wager, an identifier of the client device, and an identifier of the broadcast receiver device corresponding to the client device.

5. The method of claim 1, further comprising:
determining, by the one or more processors, that the wager corresponds to a portion of the live event; and
generating, by the one or more processors, the recording instructions to initiate a recording of only the portion of the live event corresponding to the wager.

6. The method of claim 1, wherein identifying the broadcast receiver device corresponding to the client device further comprises identifying, by the one or more processors, from a user profile used by the client device to communicate with the one or more processors, an identifier of the broadcast receiver device corresponding to the client device.

7. The method of claim 1, wherein generating the recording instructions for the broadcast receiver device further comprises generating a notification for display by the broadcast receiver device that indicates the recording of the broadcast of the live event has been scheduled.

8. The method of claim 1, further comprising:
determining, by the one or more processors, that the broadcast receiver device is authorized to record the broadcast of the live event; and
generating, by the one or more processors, the recording instructions responsive to determining that the broadcast receiver device is authorized to record the broadcast of the live event.

9. A system, comprising:
one or more processors coupled to memory, the one or more processors configured to:
identify a wager corresponding to a live event associated with a client device, the wager comprising a request to record a broadcast of the live event;
identify a broadcast receiver device corresponding to the client device;

generate recording instructions for the broadcast receiver device that cause the broadcast receiver device to initiate a recording of the broadcast of the live event; and transmit the recording instructions to the broadcast receiver device to cause the broadcast receiver device to schedule a recording for the broadcast of the live event.

10. The system of claim 9, wherein the one or more processors are further configured to:

determine a broadcast schedule of the live event based on information received from the broadcast receiver device; and generate the recording instructions for the broadcast receiver device further based on the broadcast schedule of the live event.

11. The system of claim 9, wherein the one or more processors are further configured to:

determine a broadcast schedule of the live event based on information received from a third-party data source; and generate the recording instructions for the broadcast receiver device further based on the broadcast schedule of the live event.

12. The system of claim 9, wherein the one or more processors are further configured to maintain a data structure storing an association between an identifier of the wager, an identifier of the client device, and an identifier of the broadcast receiver device corresponding to the client device.

13. The system of claim 9, wherein the one or more processors are further configured to:

determine that the wager corresponds to a portion of the live event; and generate the recording instructions to initiate a recording of only the portion of the live event corresponding to the wager.

14. The system of claim 9, wherein to identify the broadcast receiver device corresponding to the client device, the one or more processors are further configured to identify, from a user profile used by the client device to communicate with the one or more processors, an identifier of the broadcast receiver device corresponding to the client device.

15. The system of claim 9, wherein to generate the recording instructions for the broadcast receiver device, the one or more processors are further configured to generate a notification for display by the broadcast receiver device that indicates the recording of the broadcast of the live event has been scheduled.

16. The system of claim 9, wherein the one or more processors are further configured to:

determine that the broadcast receiver device is authorized to record the broadcast of the live event; and generate the recording instructions responsive to determining that the broadcast receiver device is authorized to record the broadcast of the live event.

\* \* \* \* \*